(12) United States Patent
Fan et al.

(10) Patent No.: US 12,314,829 B2
(45) Date of Patent: May 27, 2025

(54) METHOD AND APPARATUS FOR DRIVING DIGITAL HUMAN, AND ELECTRONIC DEVICE

(71) Applicant: BEIJING SOGOU TECHNOLOGY DEVELOPMENT CO., LTD., Beijing (CN)

(72) Inventors: Bo Fan, Beijing (CN); Zhen Xu, Beijing (CN); Xi Chen, Beijing (CN); Wei Chen, Beijing (CN); Fanbo Meng, Beijing (CN); Kai Liu, Beijing (CN); Kening Zhang, Beijing (CN); Wenjun Duan, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 244 days.

(21) Appl. No.: 17/989,323

(22) Filed: Nov. 17, 2022

(65) Prior Publication Data
US 2023/0082830 A1    Mar. 16, 2023

Related U.S. Application Data

(63) Continuation of application No. PCT/CN2021/078242, filed on Feb. 26, 2021, and a
(Continued)

(30) Foreign Application Priority Data

May 18, 2020   (CN) .......................... 202010420678.0
May 18, 2020   (CN) .......................... 202010420711.X
(Continued)

(51) Int. Cl.
*G06N 3/004*    (2023.01)
*G10L 13/02*    (2013.01)

(52) U.S. Cl.
CPC .............. *G06N 3/004* (2013.01); *G10L 13/02* (2013.01)

(58) Field of Classification Search
CPC ...... G06N 3/004; G06N 3/045; G06N 3/0464; G06N 3/08; G10L 13/02; G10L 13/08
See application file for complete search history.

(56) References Cited

U.S. PATENT DOCUMENTS

| 10,839,825 B2 | 11/2020 | Edwards et al. |
| 2012/0191460 A1 | 7/2012 | Ng-Thow-Hing et al. |

(Continued)

FOREIGN PATENT DOCUMENTS

| CN | 102497513 A | 6/2012 |
| CN | 104361620 A | 2/2015 |

(Continued)

OTHER PUBLICATIONS

The World Intellectual Property Organization (WIPO) International Search Report for PCT/CN2021/078242 May 28, 2021 6 Pages (including translation).

(Continued)

*Primary Examiner* — Linda Wong
(74) *Attorney, Agent, or Firm* — Anova Law Group, PLLC

(57) ABSTRACT

The present disclosure discloses a method and an apparatus for driving a digital human, and an electronic device. The method includes obtaining a target action corresponding to a target text; obtaining a reference action to be executed before the digital human executes the target action when the digital human is driven to output speech based on the target text; modifying a target action parameter of the target action according to a reference action parameter of the reference action; and driving the digital human to execute the target action according to a modified target action parameter when
(Continued)

driving the digital human to output the speech based on the target text.

19 Claims, 14 Drawing Sheets

Related U.S. Application Data continuation of application No. PCT/CN2021/078243, filed on Feb. 26, 2021, and a continuation of application No. PCT/CN2021/078248, filed on Feb. 26, 2021, and a continuation of application No. PCT/CN2021/078244, filed on Feb. 26, 2021.

(30) Foreign Application Priority Data

| May 18, 2020 | (CN) | 202010420712.4 |
|---|---|---|
| May 18, 2020 | (CN) | 202010420720.9 |

(56) References Cited

U.S. PATENT DOCUMENTS

| 2015/0142704 A1* | 5/2015 | London | G10L 15/1822 |
| | | | 706/11 |
| 2015/0187112 A1* | 7/2015 | Rozen | G06T 13/40 |
| | | | 345/473 |
| 2019/0080846 A1 | 3/2019 | Yoshida et al. | |
| 2021/0193184 A1 | 6/2021 | Yuan | |

FOREIGN PATENT DOCUMENTS

| CN | 106653052 A | 5/2017 |
|---|---|---|
| CN | 108665492 A | 10/2018 |
| CN | 109670427 A | 4/2019 |
| CN | 110136229 A | 8/2019 |
| CN | 110162598 A | 8/2019 |
| CN | 110166844 A | 8/2019 |
| CN | 110688008 A | 1/2020 |
| CN | 110688911 A | 1/2020 |
| CN | 110866968 A | 3/2020 |
| CN | 110880198 A | 3/2020 |
| CN | 111010586 A | 4/2020 |
| CN | 111010589 A | 4/2020 |
| CN | 111145322 A | 5/2020 |
| CN | 111415677 A | 7/2020 |
| KR | 20190028328 A | 3/2019 |
| KR | 20190052832 A | 5/2019 |

OTHER PUBLICATIONS

The World Intellectual Property Organization (WIPO) International Search Report for PCT/CN2021/078248 May 31, 2021 6 Pages (including translation).

The World Intellectual Property Organization (WIPO) International Search Report for PCT/CN2021/078243 Jun. 2, 2021 8 Pages (including translation).

Yi Ren et al., "FastSpeech: Fast. Robust and Controllable Text to Speech" Nov. 20, 2019, 33rd Conference on Neural Information Processing System (NeurIPS 2019).

The World Intellectual Property Organization (WIPO) International Search Report for PCT/CN2021/078244 Jun. 3, 2021 6 Pages (including translation).

* cited by examiner

METHOD AND APPARATUS FOR DRIVING DIGITAL HUMAN, AND ELECTRONIC DEVICE

RELATED APPLICATIONS

This application is a continuation of PCT Application No. PCT/CN2021/078242, filed on Feb. 26, 2021, which in turn claims priority to Chinese Patent Application No. 202010420678.0, entitled "METHOD AND APPARATUS FOR DRIVING DIGITAL HUMAN, AND ELECTRONIC DEVICE" and filed on May 18, 2020; a continuation of PCT Application No. PCT/CN2021/078248, filed on Feb. 26, 2021, which in turn claims priority to Chinese Patent Application No. 202010420711.X, entitled "FACE SWAPPING METHOD AND APPARATUS FOR VIRTUAL STREAMER, ELECTRONIC DEVICE, AND STORAGE MEDIUM" and filed on May 18, 2020; a continuation of PCT Application No. PCT/CN2021/078243, filed on Feb. 26, 2021, which in turn claims priority to Chinese Patent Application No. 202010420712.4, entitled "METHOD, APPARATUS, ELECTRONIC DEVICE, AND MEDIUM FOR REAL-TIME DRIVING OF DIGITAL HUMAN" and filed on May 18, 2020; and a continuation of PCT Application No. PCT/CN2021/078244, filed on Feb. 26, 2021, which in turn claims priority to Chinese Patent Application No. 202010420720.9, entitled "METHOD, APPARATUS, ELECTRONIC DEVICE, AND MEDIUM FOR DRIVING DIGITAL HUMAN IN REAL TIME" and filed on May 18, 2020. All aforementioned related applications are incorporated herein by reference in their entirety.

FIELD OF THE TECHNOLOGY

The present disclosure relates to the field of software technologies, and in particular, to a method and an apparatus for driving a digital human, and an electronic device.

BACKGROUND OF THE DISCLOSURE

In the present disclosure, a digital human (DH) is a comprehensive rendering technology that uses a computer to simulate a real human, and is also referred to as a virtual human, an ultra-realistic human, or a photo-realistic human. A human is extremely familiar with a real human, leading to the famous uncanny valley phenomenon. Therefore, the difficulty in realizing the degree of realism of the digital human increases exponentially. A 3D model may be realistic in a static state, but immediately becomes unrealistic once it speaks and blinks. How to make an action of the digital human change more delicately and realistically has become a technical problem that needs to be resolved urgently in current development of the digital human.

Further, based on artificial intelligence, virtual streamers with the image close to a real person are formed to support many service scenarios such as news broadcasting, virtual teachers, virtual doctors, or virtual customer service, which improves the efficiency of information expression and transmission. In many service scenarios such as news broadcasting, virtual teachers, virtual doctors, or virtual customer service conducted by virtual streamers, how to quickly perform face swapping on a virtual streamer in a historical video material becomes a current new demand.

In addition, because people are too familiar with real human beings, it takes a lot of time to make a 3D static model very realistic. But when the 3D static model is driven to perform an action, even a subtle expression change will be remodeled. As the construction of a model with high realism requires a large amount of data for calculation, the calculation process is long. An action of the model may take an hour or several hours of calculation to realize, resulting in poor real-time performance.

SUMMARY

An objective of the present disclosure is, at least in part, to provide a method and an apparatus for driving a digital human, and an electronic device, to resolve a technical problem of an abrupt action change of the digital human in the existing technology, thereby improving delicacy of an action change of the digital human.

A first aspect of the present disclosure provides a method for driving a digital human, including obtaining a target action corresponding to a target text; obtaining a reference action to be executed before the digital human executes the target action when the digital human is driven to output speech based on the target text; modifying a target action parameter of the target action according to a reference action parameter of the reference action; and driving the digital human to execute the target action according to a modified target action parameter when driving the digital human to output the speech based on the target text Another aspect of the present disclosure provides a face swapping method for a virtual streamer, including: processing a historical video material of a target virtual streamer by an end-to-end sequence learning model, to obtain face feature parameters of the target virtual streamer; performing face swapping on the target virtual streamer using a candidate virtual face, to obtain an image material corresponding to a face-swapped virtual streamer; processing the face feature parameters of the target virtual streamer and the image material by the end-to-end sequence learning model, to obtain face feature parameters of the face-swapped virtual streamer; and fusing the candidate virtual face to the historical video material according to the face feature parameters of the face-swapped virtual streamer, to obtain a face-swapped video material.

Another aspect of the present disclosure provides a method for driving a digital human in real time, including acquiring data to be processed for driving a digital human, the data to be processed includes at least one of text data and voice data; processing the data to be processed by using an end-to-end model, and determining a gesture feature sequence corresponding to the data to be processed; and inputting the gesture feature sequence into a trained muscle model, and driving a digital human through the muscle model, the processing the data to be processed by using an end-to-end model includes: acquiring a text feature and a duration feature of the data to be processed; determining the gesture feature sequence according to the text feature and the duration feature.

Another aspect of the present disclosure provides a method for driving a digital human in real time, including acquiring data to be processed for driving a digital human, the data to be processed including at least one of text data and voice data; processing the data to be processed by using an end-to-end model, and determining an acoustic feature sequence, a facial feature sequence, and a limb feature sequence corresponding to the data to be processed; and inputting the acoustic feature sequence, the facial feature sequence, and the limb feature sequence into a trained muscle model, and driving a digital human through the muscle model. The processing the data to be processed by using an end-to-end model includes acquiring a text feature and a duration feature of the data to be processed; determining the acoustic feature sequence according to the text feature and the duration feature; and determining the facial feature sequence and the limb feature sequence according to the text feature and the duration feature.

Another aspect of the present disclosure provides an electronic device, including a memory and one or more programs, the one or more programs being stored in the memory, and being configured so that one or more processors execute corresponding operation instructions comprised in the one or more programs and used for performing one or more of the above-described methods in accordance with the disclosed embodiments.

Another aspect of the present disclosure provides a non-transitory computer readable storage medium, storing a computer program, when the computer program is executed by a processor, implementing one or more of the above-described methods.

DESCRIPTION OF EMBODIMENTS

The present disclosure provides a method for driving a digital human. An insertion action is adjusted based on a reference action of the digital human, so that an action change process from the reference action to the insertion action is natural and delicate, thereby resolving a technical problem of an abrupt action change of the digital human in the existing technology.

Main implementation principles and specific implementations of the technical solutions in the embodiments of the present application, and corresponding beneficial effects that the technical solutions in the embodiments of the present invention can achieve are described in detail below with reference to the accompanying drawings.

EMBODIMENT

Figure 1:
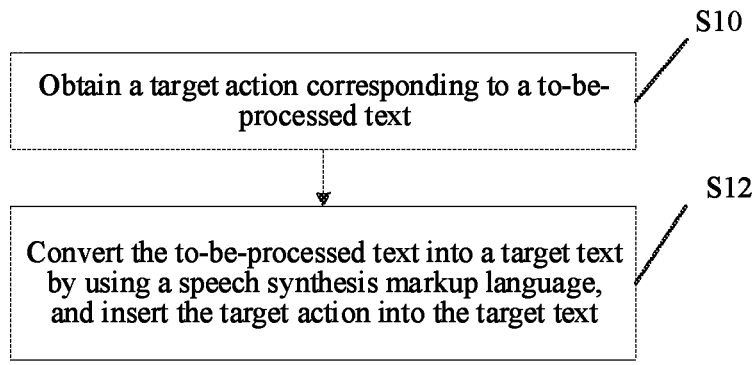
FIG. 1 is a flowchart of a method for generating a text for driving a digital human according to one or more embodiments of the present disclosure.

Referring to FIG. 1, an embodiment of the present disclosure provides a method for generating a digital human driving text. The method includes the following steps:

S10. Obtain a target action corresponding to a text that needs to be processed.

S12. Convert the text that needs to be processed into the target text by using a speech synthesis markup language, and insert a label of the target action into the target text.

In an embodiment of the present disclosure, text content of the text that needs to be processed needs to be converted into speech for output. In a process of outputting speech, an action corresponding to the text content may also need to be outputted. For example, assuming that the text that needs to be processed is "please wave your hand like me to say hello to the friend from afar", when the text is converted into speech for output, an action "wave your hand" needs to be outputted when speech "wave your hand" is outputted. In S10, one or more target actions corresponding to the text that needs to be processed are obtained. A specific quantity of the target actions is not limited in this embodiment.

Specifically, in S10, the target action corresponding to the text that needs to be processed may be obtained in any one or more of the following methods:

Method 1. Obtain a preset keyword in the text that needs to be processed. The preset keyword may be a keyword of a body action or a facial expression, such as "wave a hand", "shake the head", "smile", "sad". A predetermined action corresponding to the preset keyword is obtained as the target action, which may be a facial expression or a driving action. An action library is pre-created, to store a correspondence between keywords and actions, and an action parameter, such as a bone position parameter and a muscle movement parameter, of each action. Actions in the action library may be obtained by collecting actions of a real human by using a data collection device such as a camera and a three-dimensional scanner, or may be extracted from an existing video.

Method 2. Perform semantic recognition on the text that needs to be processed, to obtain an action intention included in the text that needs to be processed; and obtain a predetermined action corresponding to the action intention as the target action. By performing the semantic recognition, the intention of the text that needs to be processed, not just an action text, is obtained more accurately and comprehensively. For example: for a text "bright sunshine and fresh air make people feel refreshing", although no action is mentioned in the whole text, according to the meaning expressed in the whole text, "bright sunshine" may correspond to an action intention of raising the head and "fresh air" may correspond to an action intention of taking a breath. Corresponding predetermined actions are obtained according to these action intentions. Similarly, the action library may be pre-created, to store the correspondence between action intentions and actions, and the action parameter of each action, so that a predetermined action corresponding to an action intention can be quickly obtained from the action library.

Method 3. Annotate the text that needs to be processed and insert an action identifier manually. Different action identifiers correspond to different target actions. The action identifier in the text that needs to be processed is searched for when the target action is obtained, and then, the corresponding target action is obtained according to the found action identifier.

After the target action is obtained, S12 continues to be executed to perform text conversion and action insertion, so that the target text obtained by conversion can be recognized by a speech synthesis service, to provide a corresponding service. A speech synthesis markup language (SSML) is an XML-based markup language. Compared with synthesis of a pure text, the SSML can be used to enrich synthesis content to bring more changes to a final synthesis result. In this embodiment, a text, to be converted into the target text by using the SSML markup language, is placed in a label <speak></speak>, and each speech synthesis task includes one label <speak></speak>. In this embodiment, in a process of obtaining the target text by conversion, the label of the target action is also inserted into the target text by using the SSML markup language, so that the target text can not only control reading content of speech synthesis, but also control corresponding an action outputted when the speech is read.

It should be noted that the label of the target action may be an action name, and a corresponding action parameter can be obtained according to the action name when the digital human is subsequently driven. Alternatively, it is also possible that the target action parameter of the target action is used as the label and directly inserted into the target text, and then the target action parameter can be directly obtained when the digital human is driven.

Figure 2:
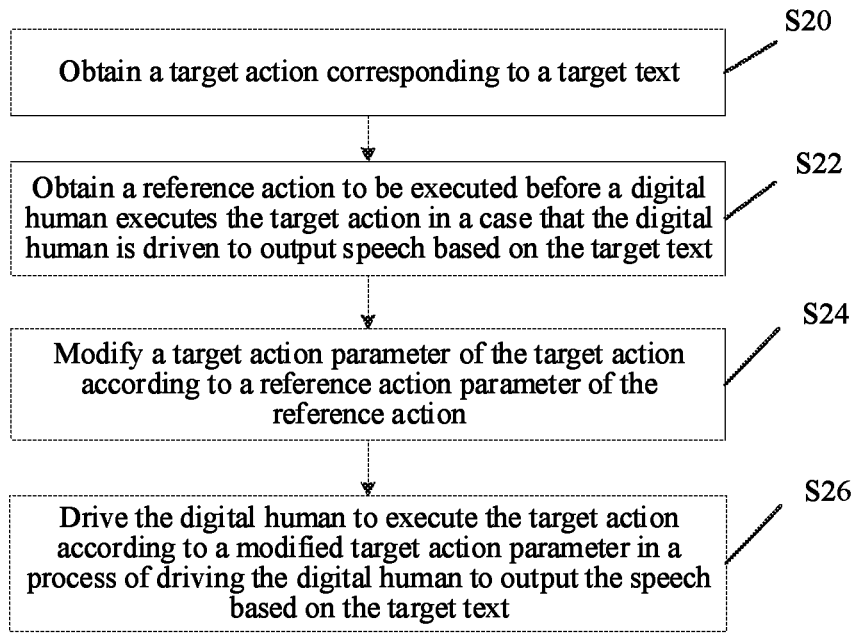
FIG. 2 is a flowchart of a method for driving a digital human according to one or more embodiments of the present disclosure.

Referring to FIG. 2, an embodiment of the present disclosure provides a method for driving a digital human. The method includes the following steps:

S20. Obtain a target action corresponding to a target text.

S22. Obtain a reference action to be executed before the digital human executes the target action when the digital human is driven to output speech based on the target text.

S24. Modify a target action parameter of the target action according to a reference action parameter of the reference action.

S26. Drive the digital human to execute the target action according to the modified target action parameter in a process of driving the digital human to output the speech based on the target text.

In a process of driving the digital human to output speech by using a text, the digital human may usually be in a common state, that is, a reference state. For example, for a digital human broadcasting news, the reference state thereof may be standing or sitting in front of a table to broadcast without an expression, or may habitually make some actions according to a habit of a newscaster. Therefore, when actions are added in a broadcast process, there may be a technical problem that two actions before and after varying greatly and actions change abruptly. In this embodiment, by pre-obtaining the target action in the target text and the reference action made by the digital human before executing the target action, the target action is modified based on the reference action, so that the target action is approximate to the reference action as much as possible, thereby resolving the technical problem of an abrupt action change because of a relatively large difference between actions.

In an embodiment of the present disclosure, in S20, the action label of the target action can be directly searched for in the target text, and then, the corresponding target action is obtained according to the action label. The target text may include labels of one or more target actions. During execution of S20, one action may be obtained at a time according to the label, or a plurality of corresponding target actions in the target text may be obtained at a time, to form a target action sequence and execute steps S22 to S26 for each target action.

In S22, the reference action made by the digital human before executing the target action is obtained. Specifically, a position feature, for example, a position between keywords x1 and x2, of the target action in the target text, and a duration feature of the target text may be obtained first, where the duration feature is generated according to phoneme feature corresponding to the target text. Then, a first time point at which the target action is executed, that is, a time point at which the target action is executed in a total duration of this speech broadcast, is obtained according to the duration feature of the target text and the position feature of the target action. Subsequently, a reference action of the digital human at an adjacent time point before the first time point is obtained according to the first time point. For example, assuming that an execution time point of the target action is 00:50:45, a reference action executed by the digital human at 00:50:44 is obtained. The reference action may be a basic action corresponding to the reference state in which the digital human is usually in, or may be a habitual action adopted in a speech input process, or may be another target action in the target text.

After the reference action is obtained, S24 continues to be executed to modify the action parameter, and the target action parameter is modified according to the reference action parameter, so that a difference between basic action parameters corresponding to the modified target action parameter and the reference action parameter is decreased. An action usually includes a basic action and a feature action, corresponding to a basic action parameter and feature action parameter respectively. The basic action may be changed according to scenarios, and the feature action usually does not change with the scenarios. For example, the feature action of "goodbye" is a wave of a palm driven by a lower arm, while the basic action includes actions of an upper arm, a head, feet, and the like. The basic action parameter in the target action parameter may be modified according to the basic action parameter in the reference action parameter when the target action parameter is modified. The difference between action parameters indicates a total difference obtained by adding up differences between corresponding parameters in the action parameters. Assuming that: a basic action parameter V=[x11~x1n, y11~y1m, z11~z1k], and a basic action parameter W=[x21~x2n, y21~y2m, z21~z2k], a difference between the two basic action parameters=Σ(x1n−x2n)+Σ(y1m−y2m)+Σ(z1k−z2k).

In an embodiment of the present disclosure, the action parameter in this embodiment may be the bone position parameter or the muscle movement parameter of the digital human, and the muscle movement parameter includes a muscle contraction parameter and a muscle relaxation parameter. A specific parameter to be obtained is determined according to a driving model of the digital human. The muscle movement parameter is used if the driving model of the digital human is a muscle binding model, or the bone position parameter is used if the driving model of the digital human is a bone animation. By using the bone position parameter as an example, modification of the target action parameter of the target action is described in detail as follows:

Step 1. Obtain the action parameter of the target action. Actions of the same type in the action library may correspond to various different forms. For example, an action "goodbye" may include waving "goodbye" in front of the chest, waving "goodbye" on a side of the body, and waving "goodbye" over the head. A form corresponds to a set of action parameters (collectively referred to as the action parameter). Each set of action parameters is divided into a start action parameter, an intermediate action parameter, and an end time parameter according to different timing, and corresponds to a complete action. In this embodiment, to make actions of the digital human change naturally and delicately, at least one target action, that is, at least one form of target action, and the action parameter of each target action are obtained from the preset action library; and according to the start action parameter of each target action, an action parameter corresponding to a start action parameter having a smallest difference with a start action parameter of the reference action parameter is obtained as the target action parameter, that is, a target action with a smallest difference from the reference action is obtained from actions in multiple forms. For example, if the reference action is "arms crossed over the chest", it is more appropriate to select waving "goodbye" in front of the chest when the target action "goodbye" is selected. A difference between arm bone position parameters of the two actions is the smallest, and thus, the actions change naturally and realistically.

Step 2. Modify the target action parameter. After the target action parameter of the target action is determined, the target action parameter is further modified according to the reference action parameter, so that the difference between the basic action parameters corresponding to the modified target action parameter and the reference action parameter is decreased, thereby minimizing a difference between the modified target action and the reference action, and making the basic actions as similar as possible. As implementations in some embodiments, the basic action parameter in the target action parameter may be modified to the basic action parameter in the reference action parameter when the target action parameter is modified. The difference between the modified target action parameter and the reference action parameter is the smallest, and the reference action coincides with the basic action of the target action with the changed parameter. For example, for the reference action "arms crossed over the chest" and the target action waving "goodbye" in front of the chest, an action parameter corresponding to an action of the upper arm in the target action may be modified to an action parameter corresponding to the action of the upper arm in the reference action, or a difference between the action parameter corresponding to the action of the upper arm in the target action and the action parameter corresponding to the action of the upper arm in the reference action may be decreased.

After S24, S26 is further executed to drive the digital human according to the modified target action parameter. Specifically, the duration feature may be obtained according to the target text when the digital human is driven based on the target text; a target speech sequence corresponding to the target text is obtained according to the duration feature; a target action sequence of the target text is obtained according to the duration feature and modification parameters of all target actions included in the target text; and the target speech sequence and the target action sequence are inputted into the driving model of the digital human, to drive the digital human to output corresponding speech and a corresponding action. In this embodiment, after the target action is executed, the digital human may further be driven to execute the reference action, that is, switch back to the reference action from the target action. During specific implementation, the reference action parameter of the reference action is added behind the target action parameter during generation of an action sequence.

In the foregoing technical solutions, by recognizing semantics and/or keywords of the text, the target action carried in the expression of the text is obtained, and the label of the target action is inserted into the text, so that the digital human is driven to execute a corresponding action by using the inserted action label when the digital human is driven based on the text, enabling actions of the digital human to be driven by the text. Further, for the target action corresponding to the text, the reference action before execution of the target action is obtained, and the action parameter of the target action is modified according to the action parameter of the reference action, to reduce the difference between the target action and the reference action, so that a conversion process of the digital human from the reference action to the target action is natural and coordinate, thereby resolving the technical problem of an abrupt action conversion of the digital human in the existing technology, thus improving delicacy of the action conversion of the digital human.

Figure 3:
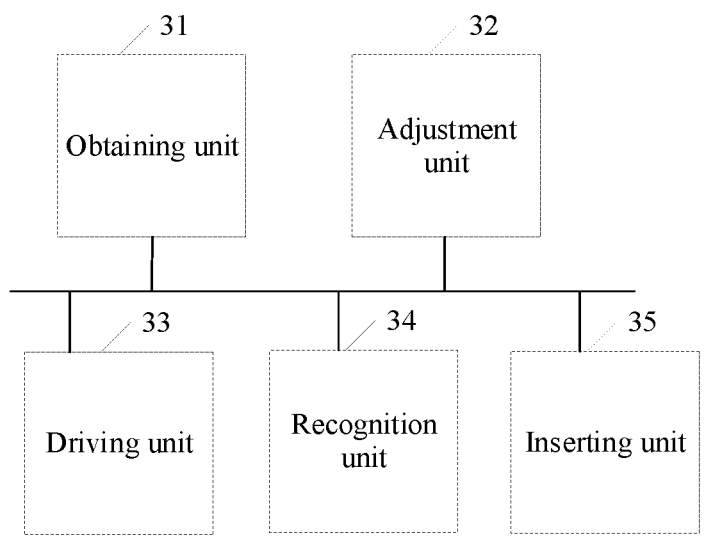
FIG. 3 is a block diagram of an apparatus for driving a digital human according to one or more embodiments of the present disclosure.

According to one aspect of the present disclosure, an apparatus for driving a digital human is further provided. Referring to FIG. 3, the apparatus includes:

an obtaining unit 31, configured to obtain a target action corresponding to a target text; and obtain a reference action to be executed before the digital human executes the target action when the digital human is driven to output speech based on the target text;

an adjustment unit 32, configured to modify a target action parameter of the target action according to a reference action parameter of the reference action; and a driving unit 33, configured to drive the digital human to execute the target action according to a modified target action parameter in a process of driving the digital human to output the speech based on the target text.

In some embodiments, the target action is a facial expression or a body action. The action parameter is a bone position parameter or a muscle movement parameter.

In some embodiments, the apparatus further includes: a recognition unit 34 and an inserting unit 35. The recognition unit 34 is configured to obtain a target action corresponding to a text that needs to be processed before obtaining the target action corresponding to the target text; and the inserting unit 35 is configured to convert the text that needs to be processed into the target text by using a speech synthesis markup language, and insert a label of the target action into the target text.

In an embodiment of the present disclosure, the recognition unit 34 may recognize and obtain the target action in either of the following methods:

Method 1. Obtain a preset keyword in the text that needs to be processed; and obtain a predetermined action corresponding to the preset keyword as the target action.

Method 2. Perform semantic recognition on the text that needs to be processed, to obtain an action intention included in the text that needs to be processed; and obtain a predetermined action corresponding to the action intention as the target action.

In some embodiments, the adjustment unit 32 may be configured to: obtain at least one target action and the action parameter of each target action from the preset action library when modifying the action parameter, the action parameter including a start action parameter and an end action parameter; obtain an action parameter corresponding to a start action parameter having a smallest difference with an end action parameter in the reference action parameter as the target action parameter according to the action parameter of each target action; and modify the target action parameter according to the reference action parameter, so that a difference between basic action parameters corresponding to the modified target action parameter and the reference action parameter is decreased.

For the apparatus in an embodiment of the present disclosure, a specific manner in which each module performs an operation is already described in detail in the embodiments related to the method, and details are not described herein again.

Figure 4:
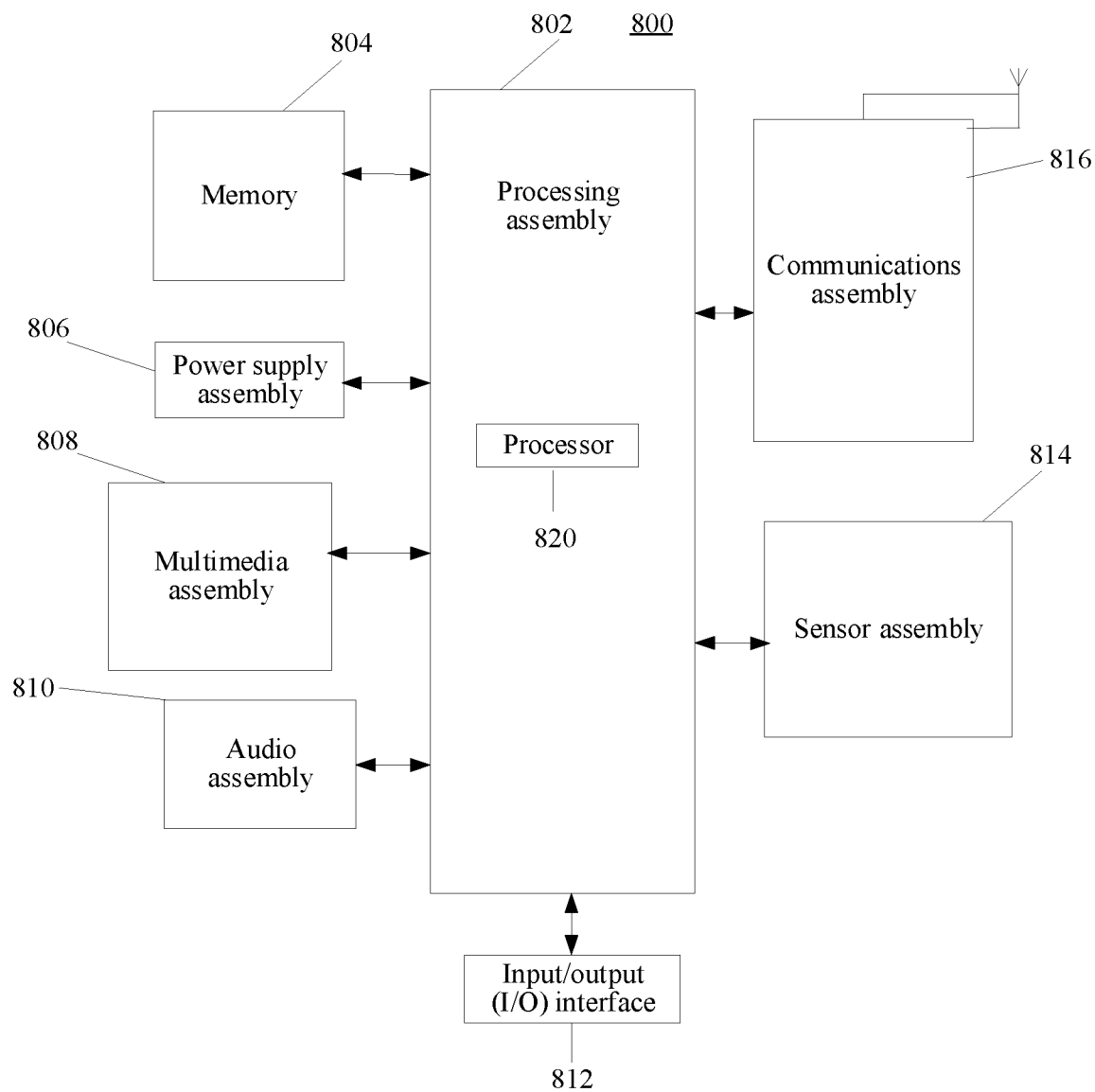
FIG. 4 is a schematic structural diagram of an electronic device according to one or more embodiments of the present disclosure.

FIG. 4 is a block diagram of an electronic device 800 configured to implement a method for driving a digital human according to one or more embodiments of the present disclosure. For example, the electronic device 800 may be a mobile phone, a computer, a digital broadcasting terminal, a message transceiver, a game controller, a tablet device, a medical device, a fitness facility, a personal digital assistant, or the like.

Referring to FIG. 4, the electronic device 800 may include one or more of the following assemblies: a processing assembly 802, a memory 804, a power supply assembly 806, a multimedia assembly 808, an audio assembly 810, an input/output (I/O) interface 812, a sensor assembly 814, and a communications assembly 816.

The processing assembly 802 controls integral operations of the electronic device 800, such as operations related to displaying, a phone call, data communication, a camera operation, and a record operation. The processing assembly 802 may include one or more processors 820 to execute instructions, to complete all or some steps of the foregoing method. In addition, the processing assembly 802 may include one or more modules, to facilitate the interaction between the processing assembly 802 and other assemblies. For example, the processing assembly 802 may include a multimedia module, to facilitate the interaction between the multimedia assembly 808 and the processing assembly 802.

The memory 804 is configured to store data of various types to support operations on the device 800. Examples of the data include instructions of any application program or method for operations on the electronic device 800, such as contact data, address book data, a message, a picture, and a video. The memory 804 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply assembly 806 provides power for various assemblies of the electronic device 800. The power supply assembly 806 may include a power supply management system, one or more power supplies, and other assemblies associated with generating, managing and allocating power for the electronic device 800.

The multimedia assembly 808 includes a screen providing an output interface between the electronic device 800 and a user. In some embodiments, the screen may include a liquid crystal display (LCD) and a touch panel (TP). If the screen includes the touch panel, the screen may be implemented as a touchscreen to receive an input signal from the user. The touch panel includes one or more touch sensors to sense a touch, a slide, and a gesture on the touch panel. The touch sensor may not only sense the boundary of touching or sliding operations, but also detect duration and pressure related to the touching or sliding operations. In some embodiments, the multimedia assembly 808 includes a front camera and/or a rear camera. When the device 800 is in an operating mode, such as a shooting mode or a video mode, the front-facing camera and/or the rear-facing camera may receive external multimedia data. Each front camera and rear camera may be a fixed optical lens system or have a focal length and an optical zooming capability.

The audio assembly 810 is configured to output and/or input an audio signal. For example, the audio assembly 810 includes a microphone (MIC), and when the electronic device 800 is in an operation mode, such as a call mode, a recording mode, and a voice identification mode, the MIC is configured to receive an external audio signal. The received audio signal may be further stored in the memory 804 or sent through the communication assembly 816. In some embodiments, the audio assembly 810 further includes a loudspeaker, configured to output an audio signal.

The I/O interface 812 provides an interface between the processing assembly 802 and an external interface module. The external interface module may be a keyboard, a click wheel, buttons, or the like. The buttons may include, but not limited to a homepage button, a volume button, a start-up button, and a locking button.

The sensor assembly 814 includes one or more sensors, configured to provide status evaluation in each aspect to the electronic device 800. For example, the sensor assembly 814 may detect an opened/closed state of the electronic device 800, and relative positioning of the assembly. For example, the assembly is a display and a small keyboard of the electronic device 800. The sensor assembly 814 may further detect the position change of the electronic device 800 or one assembly of the electronic device 800, the existence or nonexistence of contact between the user and the electronic device 800, the azimuth or acceleration/deceleration of the electronic device 800, and the temperature change of the electronic device 800. The sensor assembly 814 may include a proximity sensor, configured to detect the existence of nearby objects without any physical contact. The sensor assembly 814 may further include an optical sensor, such as a CMOS or CCD image sensor, which is used in an imaging application. In some embodiments, the sensor assembly 814 may further include an acceleration sensor, a gyroscope sensor, a magnetic sensor, a pressure sensor, or a temperature sensor.

The communication assembly 816 is configured to facilitate communication in a wired or wireless manner between the electronic device 800 and other devices. The electronic device 800 may access a communication standard-based wireless network, such as Wi-Fi, 2G, 3G, or a combination thereof. In an exemplary embodiment, the communication assembly 816 receives a broadcast signal or broadcast related information from an external broadcast management system via a broadcast channel. In an exemplary embodiment, the communication assembly 816 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In an example of an embodiment, the electronic device 800 may be implemented by using one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, to execute the foregoing method.

According to another aspect of the present disclosure, a non-transitory computer readable storage medium including instructions, for example, a memory 804 including instructions, is further provided, and the foregoing instructions may be executed by a processor 820 of the electronic device 800 to complete the foregoing method. For example, the non-temporary computer-readable storage medium may be a ROM, a random access memory (RAM), a CD-ROM, a magnetic tape, a floppy disk, an optical data storage device, or the like.

When the instructions in the storage medium is executed by a processor of a mobile terminal, the non-transitory computer readable storage medium enables the mobile terminal to execute a method for driving a digital human. The method includes: obtaining a target action corresponding to a target text; obtaining a reference action to be executed before the digital human executes the target action when the digital human is driven to output speech based on the target text; modifying a target action parameter of the target action according to a reference action parameter of the reference action; and driving the digital human to execute the target action according to a modified target action parameter in a process of driving the digital human to output the speech based on the target text.

Figure 5:
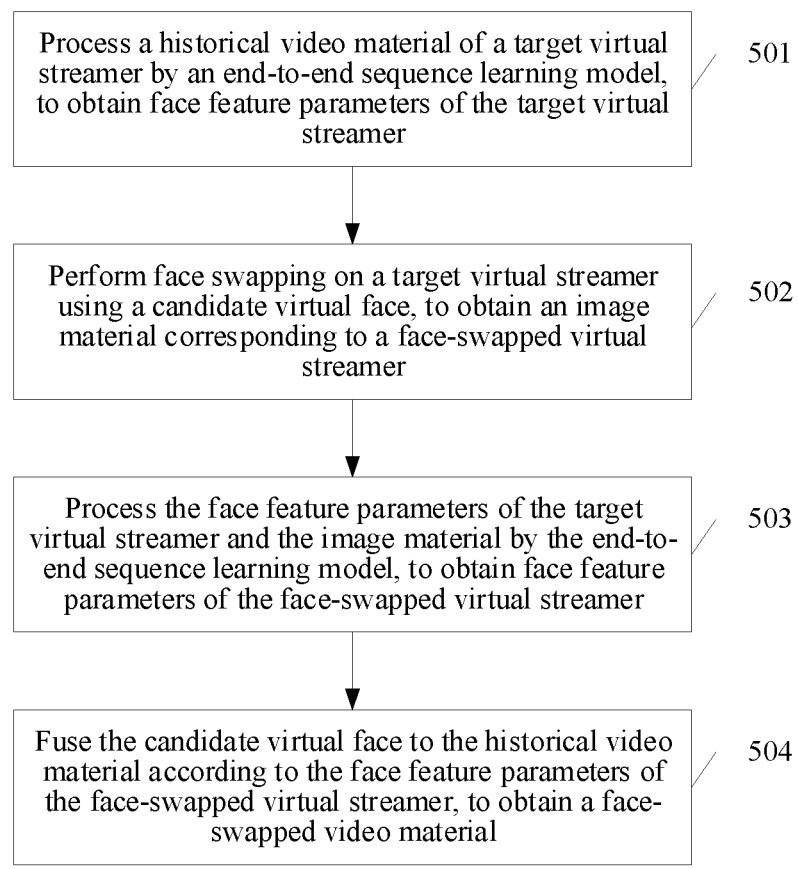
FIG. 5 shows a flowchart of a face swapping method for a virtual streamer according to one or more embodiments of this application.

According to another aspect, this application provides a face swapping method for a virtual streamer. Referring to FIG. 5, FIG. 5 is a flowchart of a face swapping method for a virtual streamer in this application. The face swapping method for a virtual streamer provided in this application includes the following steps:

501: Process a historical video material of a target virtual streamer by an end-to-end sequence learning model, to obtain face feature parameters of the target virtual streamer.

In some embodiments, the historical video material may be a video clip broadcast by the target virtual streamer, for example, may be a 30-minute news broadcast clip broadcast by the target virtual streamer, or a 1-hour teaching video conducted by the target virtual streamer. The target virtual streamer is a digital human obtained by modeling a real person, and the target virtual streamer driven and created by text can broadcast news, become a virtual teacher or virtual doctor, or conduct virtual customer service. The target virtual streamer presents half-body image, full-body image, or head image in the historical video material. The face swapping for a virtual streamer in this application is only for a face or head of the target virtual streamer.

The end-to-end sequence learning model used in this application may be an end-to-end text-to-speech conversion model, such as a FastSpeech model or an end-to-end text-to-speech conversion model based on a deep neural network. The FastSpeech model is a sequence learning model formed by adopting a feed forward network based on Transformer and a self-attention mechanism in one-dimensional convolution.

In some embodiments, the FastSpeech model is trained using a historical video material as a sample for training the FastSpeech model, to extract face feature parameters of the target virtual streamer from the historical video material.

In some embodiments, the specific types of the extracted face feature parameters of the target virtual streamer vary correspondingly according to different face swapping manners, and each type is described as follows:

Method 1: If face swapping is performed on the target virtual streamer in the historical video material based on a candidate virtual face having the same facial contour as the target virtual streamer or meeting a preset contour similarity, only facial feature motion parameters of the target virtual streamer under different expressions are extracted.

The candidate virtual face may be a digital face obtained by modeling a face of another real person, or a virtual face screened from a digital face database. In some embodiments, the candidate virtual face is different from the looks of the target virtual streamer. The implementation process of processing the historical video material by the FastSpeech model to extract the facial feature motion parameters of the target virtual streamer under different expressions is described below in more detail:

First, perform step A1: mapping the historical video material by an embedding layer of the FastSpeech model, to collect an original facial feature of the target virtual streamer and a source text feature corresponding to the original facial feature, where the source text feature is at a phoneme level.

Then, perform step A2: processing the original facial feature and the source text feature in step A1 by a feed forward transformer of the FastSpeech model, to obtain an original facial feature vector corresponding to the original facial feature and a first text encoding feature corresponding to the source text feature, where the original facial feature vector is a feature representation for performing facial expressions and lip motions, and the first text encoding feature is at the phoneme level.

Next, perform step A3: aligning the original facial feature vector with the first text encoding feature, and performing splicing and decoding after the alignment, to obtain a facial feature motion parameter sequence of the target virtual streamer, that is, the facial feature motion parameters of the target virtual streamer under different expressions, where a duration predictor can be used to align the original facial feature vector with the first text encoding feature.

In some embodiments, the processing process of step A3 includes: splicing the first text encoding feature at the phoneme level and the original facial feature vector by the FastSpeech model; decoding a frame-level encoding feature obtained by splicing by a decoder of the FastSpeech model, to obtain the facial feature motion parameters; passing the frame-level coding feature through a gradient reversal layer (GRL) of the FastSpeech model, so that a gradient direction is automatically reversed in a backward propagation process, and an identical transformation is implemented in the forward propagation process; and inputting the frame-level encoding feature that has passed through the GRL to a motion parameter classifier, to obtain a corresponding classification probability.

Because the FastSpeech model is a non-autoregressive model using a feed forward transformer, there is no need to explicitly rely on previous elements. Compared with sequence-based learning using an encoder-attention-decoder-based architecture, this application implements parallel generation of the facial feature motion parameter sequence, thereby efficiently processing the historical video material.

In some embodiments, the facial feature motion parameter sequence contains a plurality of sets of facial feature motion parameters, where each set of facial feature motion parameters includes motion parameters of facial features such as facial muscles, eyes, nose, eyebrows, and mouth.

The source text feature in this application may include phoneme features and/or semantic features. Further, the phoneme is a minimum phonetic unit obtained by division according to a natural attribute of a speech, analysis is performed according to pronunciation actions in syllables, and a pronunciation action forms a phoneme. In some embodiments, the phoneme features sequentially correspond to the original facial features. The facial features include an expression feature and a lip feature. The expression is to express feelings and affection, and can refer to thoughts and feelings expressed on the face. The expression features are usually for the whole face. The lip feature may be specially for the lip, and is related to the text content, speech, pronunciation manner, and the like of the text, so that facial expressions and lip motions can be made more realistic and delicate through the facial feature motion parameters.

Method 2: If face swapping is performed on the target virtual streamer in the historical video material based on any candidate virtual face, for example, when the candidate virtual face and the target virtual streamer have different genders, different face shapes, or the like, in order to improve the face swapping effect, for the extraction of the face feature parameters of the target virtual streamer, in addition to the facial feature motion parameter sequence of the target virtual streamer in the historical video material, one or more of the facial contour parameters, facial feature proportion parameters, and gender feature parameters of the target virtual streamer are also extracted. In some embodiments, of the facial contour parameters, facial feature proportion parameters, and gender feature parameters may all be extracted in an existing manner or in the same implementation as the foregoing steps A1 to A3, which are not repeated herein again for the simplicity of the specification.

Method 3: If the head rather than just the face of the target virtual streamer in the historical video material is directly replaced based on the candidate virtual face, for the extraction of the face feature parameters of the target virtual streamer, in addition to the facial feature motion parameters of the target virtual streamer under different expressions, head features of the target virtual streamer, and proportion parameters between the head of the target virtual streamer and body parts of the target virtual streamer except the head such as a proportion between the head and neck of the target virtual streamer are also extracted. In some embodiments, the head features of the target virtual streamer and the proportion parameters between the head of the target virtual streamer and body parts of the target virtual streamer except the head may be extracted in an existing manner or in the same implementation as in the foregoing steps A1 to A3, which are not repeated herein again for the simplicity of the specification.

Step 502: Perform face swapping on the target virtual streamer using a candidate virtual face, to obtain an image material corresponding to a face-swapped virtual streamer.

In some embodiments, in order to make the face effect of the face-swapped virtual streamer more natural, in this application, the determined candidate virtual face can be fused with the face of the target virtual streamer in an offline processing manner, to obtain the image material corresponding to the face-swapped virtual streamer. Because the face-swapped virtual streamer in the image material combines the facial features of the target virtual streamer and the candidate virtual face, the face swapping effect is more natural.

The process of fusing the candidate virtual face with the face of the target virtual streamer is described in detail below:

First, a fusion degree $\alpha$ ($0=<\alpha<=1$) needs to be set, and face key point detection is performed on the candidate virtual face to obtain face key points of the candidate virtual face; and face key point detection is performed on the target virtual streamer on the historical video material, to obtain face key points of the target virtual streamer. Affine transformation is performed on the face key points of the candidate virtual face and the face key points of the target virtual streamer, to obtain corresponding affine face images. A weighted average of the points of the two affine face images is calculated according to the set fusion degree $\alpha$, to obtain a fused image, and the fused image contains the image material corresponding to the face-swapped virtual streamer. The value of the fusion degree $\alpha$ determines the proximity degree of the face of the virtual streamer image after face fusion to the candidate virtual face and to the looks of the target virtual streamer. When a is equal to 0.5, it is equivalent to averaging the candidate virtual face and the face of the target virtual streamer.

503: Process the face feature parameters of the target virtual streamer and the image material by the end-to-end sequence learning model, to obtain face feature parameters of the face-swapped virtual streamer.

In some embodiments, the obtained face feature parameters of the face-swapped virtual streamer correspond to the face feature parameters of the target virtual streamer. Therefore, the face feature parameters of the face-swapped virtual streamer include: facial feature motion parameters of the face-swapped virtual streamer under different expressions; or the facial feature motion parameters of the face-swapped virtual streamer under different expressions and at least one of the following additional parameters: facial contour parameters of the face-swapped virtual streamer, facial feature proportion parameters of the face-swapped virtual streamer, gender feature parameters of the face-swapped virtual streamer, and proportion parameters between a head of the face-swapped virtual streamer and body parts of the face-swapped virtual streamer except the head.

In some embodiments, the facial feature motion parameters of the face-swapped virtual streamer under different expressions may be extracted by the end-to-end sequence learning model, and the specific process is as follows:

Step B1: Map the image material by an embedding layer of the end-to-end sequence learning model, to obtain a face-swapped facial feature of the face-swapped virtual streamer;

Step B2: Process the face-swapped facial feature and the face feature parameters of the target virtual streamer by a feed forward transformer of the end-to-end sequence learning model, to obtain a face-swapping facial feature vector corresponding to the face-swapped facial feature and a second text encoding feature corresponding to the face feature parameters of the target virtual streamer; and Step B3: Perform splicing and decoding after aligning the face-swapping facial feature vector with the second text encoding feature, to obtain the facial feature motion parameters of the face-swapped virtual streamer.

In some embodiments, for more implementation details of steps B1 to B3, reference may be made to the foregoing detailed description of steps A1 to A3, which are not repeated herein again for the simplicity of the specification.

The facial contour parameters of the face-swapped virtual streamer, facial feature proportion parameters of the face-swapped virtual streamer, gender feature parameters of the face-swapped virtual streamer, and proportion parameters between a head of the face-swapped virtual streamer and body parts of the face-swapped virtual streamer except the head may be extracted by using the related art or a similar implementation to the above steps B1 to B3.

504: Fuse the candidate virtual face to the historical video material according to the face feature parameters of the face-swapped virtual streamer, to obtain a face-swapped video material.

In some embodiments, the facial feature motion parameters of the face-swapped virtual streamer are inputted to a muscle model bound with the face-swapped virtual streamer, and facial features of the face-swapped virtual streamer are driven to move, to obtain the face-swapped video material.

Figure 6:
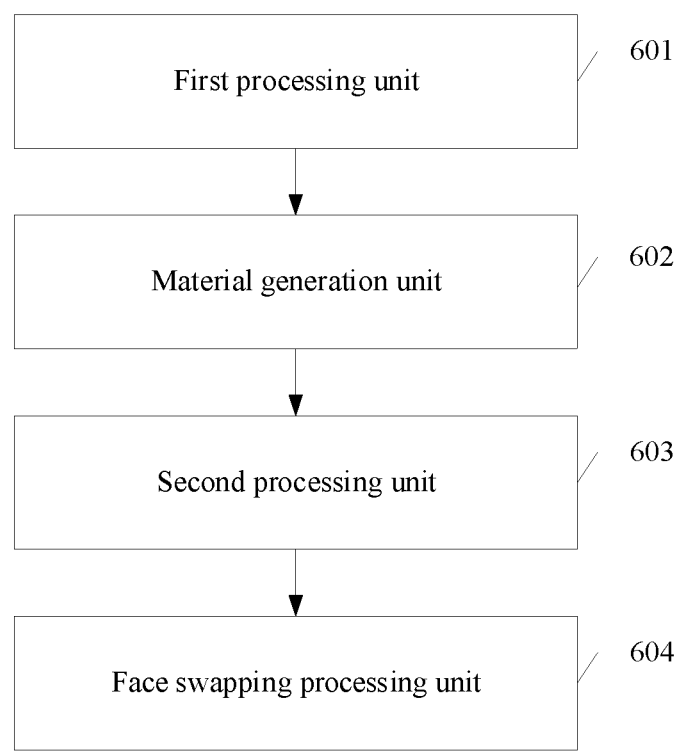
FIG. 6 shows a functional block diagram of a face swapping apparatus for a virtual streamer according to one or more embodiments of this application.

According to a second aspect, based on the same concept as the foregoing face swapping method for a virtual streamer, this application provides a face swapping apparatus for a virtual streamer. Referring to FIG. 6, the apparatus includes: a first processing unit 601, configured to process a historical video material of a target virtual streamer by an end-to-end sequence learning model, to obtain face feature parameters of the target virtual streamer; a material generation unit 602, configured to perform face swapping on the target virtual streamer using a candidate virtual face, to obtain an image material corresponding to a face-swapped virtual streamer; a second processing unit 603, configured to process the face feature parameters of the target virtual streamer and the image material by the end-to-end sequence learning model, to obtain face feature parameters of the face-swapped virtual streamer; and a face swapping processing unit 604, configured to fuse the candidate virtual face to the historical video material according to the face feature parameters of the face-swapped virtual streamer, to obtain a face-swapped video material.

In some embodiments, the face feature parameters of the target virtual streamer include: facial feature motion parameters of the target virtual streamer under different expressions; or the facial feature motion parameters of the target virtual streamer under different expressions and at least one of the following additional parameters: facial contour parameters of the target virtual streamer, facial feature proportion parameters of the target virtual streamer, gender feature parameters of the target virtual streamer, and proportion parameters between a head of the target virtual streamer and body parts of the target virtual streamer except the head.

In some embodiments, the first processing unit 601 includes: a first mapping unit, configured to map the historical video material by an embedding layer of the end-to-end sequence learning model, to obtain an original facial feature of the target virtual streamer and a source text feature corresponding to the original facial feature;

a first encoding unit, configured to process the original facial feature and the source text feature by a feed forward transformer of the end-to-end sequence learning model, to obtain an original facial feature vector corresponding to the original facial feature and a first text encoding feature corresponding to the source text feature; and a first alignment unit, configured to perform splicing and decoding after aligning the original facial feature vector with the first text encoding feature, to obtain the facial feature motion parameters of the target virtual streamer.

In some embodiments, the material generation unit 602 includes: a determination subunit; configured to determine a candidate virtual face; and a face fusion subunit, configured to perform, for the target virtual streamer on the historical video material, face fusion on the candidate virtual face and a face part of the target virtual streamer as the image material corresponding to the face-swapped virtual streamer.

In some embodiments, the face feature parameters of the face-swapped virtual streamer include: facial feature motion parameters of the face-swapped virtual streamer under different expressions; or the facial feature motion parameters of the face-swapped virtual streamer under different expressions and at least one of the following additional parameters: facial contour parameters of the face-swapped virtual streamer, facial feature proportion parameters of the face-swapped virtual streamer, gender feature parameters of the face-swapped virtual streamer, and proportion parameters between a head of the face-swapped virtual streamer and body parts of the face-swapped virtual streamer except the head.

In some embodiments, the second processing unit 603 includes: a second mapping unit, configured to map the image material by an embedding layer of the end-to-end sequence learning model, to obtain a face-swapped facial feature of the face-swapped virtual streamer; a second encoding unit, configured to process the face-swapped facial feature and the face feature parameters of the target virtual streamer by a feed forward transformer of the end-to-end sequence learning model, to obtain a face-swapping facial feature vector corresponding to the face-swapped facial feature and a second text encoding feature corresponding to the face feature parameters of the target virtual streamer; and a second alignment unit, configured to perform splicing and decoding after aligning the face-swapping facial feature vector with the second text encoding feature, to obtain the facial feature motion parameters of the face-swapped virtual streamer.

In some embodiments, the face swapping processing unit 604 is specifically configured to: input the facial feature motion parameters of the face-swapped virtual streamer to a muscle model bound with the face-swapped virtual streamer, and drive facial features of the face-swapped virtual streamer to move, to obtain the face-swapped video material.

For specific implementation details of the face swapping apparatus for a virtual streamer provided in this application, reference may be made to the description of the embodiment of the face swapping method for a virtual streamer. The face swapping apparatus for a virtual streamer combines the face feature parameters before and after face swapping, to ensure that the facial features of the streamer move naturally and harmoniously on the face-swapped video material, thereby generating the high-quality face-swapped video material, and improving the utilization of the video material based on the virtual streamer.

Referring back to FIG. 4, FIG. 4 is also a block diagram of an electronic device 800 for implementing face swapping of a virtual streamer according to an exemplary embodiment. For example, the electronic device 800 may be a mobile phone, a computer, a digital broadcasting terminal, a message transceiver, a game console, a tablet device, a medical device, a fitness facility, a personal digital assistant, or the like.

Referring to FIG. 4, the electronic device 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls the whole operation of the electronic device 800, such as operations associated with displaying, a phone call, data communication, a camera operation, and a recording operation. The processing component 802 may include one or more processors 820 to execute instructions, to complete all or some steps of the foregoing method. In addition, the processing component 802 may include one or more modules, to facilitate the interaction between the processing component 802 and other components. For example, the processing component 802 may include a multimedia module, to facilitate the interaction between the multimedia component 808 and the processing component 802.

The memory 804 is configured to store data of various types to support operations on the electronic device 800. Examples of the data include instructions, contact data, phonebook data, messages, pictures, videos, and the like of any application or method used for operations on the electronic device 800. The memory 804 may be implemented by a volatile or non-volatile storage devices of any type or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 806 provides power for various components of the electronic device 800. The power component 806 may include a power supply management system, one or more power supplies, and other components associated with generating, managing and allocating power for the electronic device 800.

The multimedia component 808 includes a screen providing an output interface between the electronic device 800 and a user. In some embodiments, the screen may include a liquid crystal display (LCD) and a touch panel (TP). If the screen includes a TP, the screen may be implemented as a touchscreen to receive an input signal from the user. The TP includes one or more touch sensors to sense a touch, a slide, and a gesture on the TP. The touch sensor may not only sense a perimeter of a touch or slide operation, but also detect duration and pressure related to the touch or slide operation.

In some embodiments, the multimedia component 808 includes a front-facing camera and/or a rear-facing camera. When the electronic device 800 is in an operating mode, such as a shooting mode or a video mode, the front-facing camera and/or the rear-facing camera may receive external multimedia data. Each front-facing camera and rear-facing camera may be a fixed optical lens system or have a focal length and an optical zooming capability.

The audio component 810 is configured to output and/or input an audio signal. For example, the audio component 810 includes a microphone (MIC), and when the electronic device 800 is in an operating mode, such as a call mode, a recording mode, and a voice identification mode, the MIC is configured to receive an external audio signal. The received audio signal may be further stored in the memory 804 or sent through the communication component 816. In some embodiments, the audio component 810 further includes a speaker, configured to output an audio signal.

The I/O interface 812 provides an interface between the processing component 802 and a peripheral interface module. The peripheral interface module may be a keyboard, a click wheel, buttons, or the like. The buttons may include, but are not limited to a homepage button, a volume button, a start-up button, and a locking button.

The sensor component 814 includes one or more sensors configured to provide status evaluation in each aspect for the electronic device 800. For example, the sensor component 814 may detect an on/off status of the electronic device 800, and relative positioning of the components. For example, the components are a display and a small keyboard of the electronic device 800. The sensor component 814 may further detect the position change of the electronic device 800 or one component of the electronic device 800, the existence or nonexistence of contact between the user and the electronic device 800, the azimuth or acceleration/deceleration of the electronic device 800, and the temperature change of the electronic device 800. The sensor component 814 may include a proximity sensor configured to detect the existence of nearby objects without any physical contact. The sensor component 814 may further include an optical sensor, such as a CMOS or CCD image sensor, which is used in an imaging application. In some embodiments, the sensor component 814 may further include an acceleration sensor, a gyroscope sensor, a magnetic sensor, a pressure sensor, or a temperature sensor.

The communication component 816 is configured to facilitate communication in a wired or wireless manner between the electronic device 800 and other devices. The electronic device 800 may access a communication standard-based wireless network, such as WiFi, 2G, or 3G, or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In an exemplary embodiment, the electronic device 800 may be implemented as one or more application-specific integrated circuits (ASICs), a digital signal processor (DSP), a digital signal processing device (DSPD), a programmable logic device (PLD), a field programmable gate array (FPGA), a controller, a micro-controller, a microprocessor or other electronic elements, so as to perform the foregoing method.

This application further provides a non-transitory computer readable storage medium including instructions, for example, a memory 804 including instructions. The foregoing instructions may be executed by the processor 820 of the electronic device 800 to complete the foregoing method. For example, the non-temporary computer-readable storage medium may be a ROM, a random access memory (RAM), a CD-ROM, a magnetic tape, a floppy disk, or an optical data storage device.

A solution for driving a digital human in real time is provided according to another embodiment of the present disclosure. This solution is used for driving a digital human in real time, and may specifically include: acquiring data to be processed for driving a digital human, the data to be processed including at least one of text data and voice data; processing the data to be processed by using an end-to-end model, and determining a gesture feature sequence corresponding to the data to be processed; and inputting the gesture feature sequence into a trained muscle model, and driving a digital human through the muscle model, the processing the data to be processed by using an end-to-end model, and determining a gesture feature sequence corresponding to the data to be processed including acquiring a text feature and a duration feature of the data to be processed; determining the gesture feature sequence according to the text feature and the duration feature.

The digital human according to some embodiments of the present disclosure may specifically be a high-simulation digital human which is only slightly different from a real person. The digital human may be applied to content presentation scenarios such as news broadcast scenarios, teaching scenarios, medical scenarios, customer service scenarios, legal scenarios, and conference scenarios.

In an embodiment of the present disclosure, the data to be processed may be text data, voice data, or text data and voice data, which is not particularly limited in this specification.

For example, in a news broadcast scenario, a to-be-broadcast press release for driving a digital human needs to be acquired. In this case, the press release is the data to be processed, and the press release may be a text edited by a human or machine. After the text is edited by the human or machine, the edited text is acquired as the press release. The press release is broadcast with gestures.

In an embodiment of the present disclosure, before the data to be processed is processed by using the end-to-end model, the end-to-end model needs to be trained through samples to obtain a trained end-to-end model. After the trained end-to-end model is obtained, the data to be processed is processed by using the trained end-to-end model.

In an embodiment of the present disclosure, the end-to-end model includes two training methods, where one of which is for training the end-to-end model to output an acoustic feature sequence, and the other is for training the end-to-end model to output a gesture feature sequence. The end-to-end model may specifically be a fastspeech model.

Figure 7:
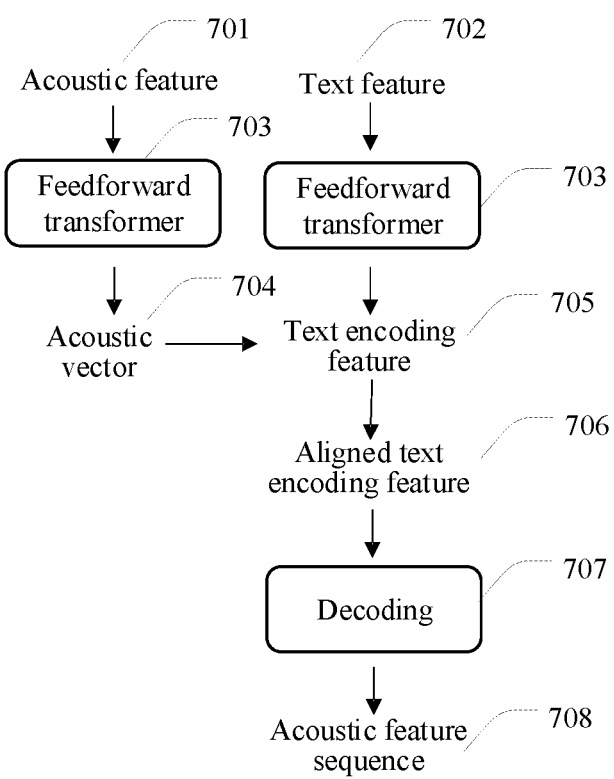
FIG. 7 is a training flowchart for training an end-to-end model for outputting an acoustic feature sequence according to one or more embodiments of the present disclosure.

Training samples for training the end-to-end model for outputting an acoustic feature sequence may be text and voice data, or may be video data. For each training sample in a training sample set, specific training steps are shown in FIG. 7. Step A1 is first performed to obtain an acoustic feature 701 and a text feature 702 of the training sample. The text feature 701 may be at a phoneme level. Specifically, feature data of the training sample may be mapped to an embedding layer in the end-to-end model to obtain the acoustic feature 701 and the text feature 702. Then step A2 is performed to process the acoustic feature 701 and the text feature 702 by using a feedforward transformer 703 to obtain an acoustic vector 704 and a text encoding feature 705. The acoustic vector 704 may be an acoustic vector of a sentence, or an acoustic vector of a word. The text encoding feature 705 is also at the phoneme level. Next, step A3 is performed to align the acoustic vector 704 and the text encoding feature 705 to obtain an aligned text encoding feature 706. A duration predictor may be used to align the acoustic vector 704 and the text encoding feature 705. The text encoding feature 705 is specifically a phoneme feature, and the acoustic vector 704 may be a mel spectrogram, in which case the phoneme feature and the mel spectrogram may be aligned using the duration predictor. Next, step A4 is performed to decode 707 the aligned text encoding features 706 to obtain an acoustic feature sequence 708. In this case, a length adjuster may be used to easily determine a speech speed by extending or shortening the phoneme duration, so as to determine a length of the generated mel spectrogram; and a space may be added between adjacent phonemes to control part of prosody. The acoustic feature sequence is obtained according to the determined length of the mel spectrogram and the space between phonemes.

A training sample set for training the end-to-end model for outputting an acoustic feature sequence may contain, for example, 13,100 audio clips and corresponding text recordings, with a total audio length of about 24 hours. In this case, the training sample set is randomly divided into three groups: 12500 samples for training, 300 samples for verification, and 300 samples for testing. To alleviate the problem of mispronunciation, a phoneme conversion tool is used to convert text sequences to phoneme sequences. For voice data, an original waveform is converted to a mel spectrogram. Then the end-to-end model is trained using 12500 samples, and after the training is complete, the trained end-to-end model is verified using the 300 verification samples. After it is determined that the end-to-end model obtained after the training meets a verification requirement, the end-to-end model obtained after the training is tested with the 300 testing samples. If the end-to-end model obtained after the training meets a test condition, the trained end-to-end model is obtained.

If the end-to-end model fails to meet the verification requirement, the end-to-end model is trained again using training samples until the end-to-end model obtained after the training meets the verification requirement. The end-to-end model that meets the verification requirement is tested until the end-to-end model obtained after the training meets both the verification requirement and the test condition; then the end-to-end model obtained after the training is used as a final model, i.e., the trained end-to-end model.

Training samples for training the end-to-end model for outputting a gesture feature sequence may be real-person video data and real-person action data. For each training sample in a training sample set, specific training steps are as follows. Step B1 is first performed to obtain a gesture feature and a text feature of the training sample. The text feature may be at the phoneme level. Specifically, feature data of the training sample may be mapped to an embedding layer in the end-to-end model to obtain the gesture feature and the text feature. Then step B2 is performed to process the gesture feature and the text feature by using a feedforward transformer to obtain a gesture feature vector and a text encoding feature. The gesture feature vector may be a muscle action vector. The text encoding feature is also at the phoneme level. Next, step B3 is performed to align the gesture feature vector with the text encoding feature. A duration predictor may be used to align the gesture feature vector with the text encoding feature. The text encoding feature is specifically a phoneme feature. Next, step B4 is performed to acquire a gesture feature sequence. In this case, a length adjuster may be used to align gesture actions by extending or shortening the phoneme duration, so as to obtain the gesture feature sequence.

In an embodiment of the present disclosure, the text feature may include a phoneme feature and/or a semantic feature, and the like. Further, a phoneme is the smallest phonetic unit of speech divided according to natural properties. As analyzed according to pronunciation actions in syllables, one action constitutes one phoneme. Phonemes may include vowels and consonants. In some embodiments, a specific phoneme feature corresponds to a specific lip feature, facial expression feature, or gesture feature, etc.

Semantics refers the meanings of concepts represented by objects in the real world that correspond to a text to be processed, and the relationship between these meanings, and is an interpretation and logical representation of the text to be processed in a certain field. In some embodiments, a specific semantic feature corresponds to a specific gesture feature, etc.

A training sample set for training the end-to-end model for outputting a gesture feature sequence includes real-person action data or real-person video data. For the training process of the end-to-end model for outputting a gesture feature sequence, reference may be made to the training process of the end-to-end model for outputting an acoustic feature sequence, and the details will not be repeated herein for the sake of brevity.

Accordingly, after data to be processed is obtained, a text feature of the data to be processed may be acquired by using an embedding layer of the second end-to-end model, then a duration feature of the data to be processed may be acquired, and the text feature and the duration feature are inputted into the second end-to-end model to obtain the gesture feature sequence.

Of course, after data to be processed is obtained, a text feature of the data to be processed may be acquired by using an embedding layer of the first end-to-end model, then a duration feature of the data to be processed may be acquired, and the text feature and the duration feature are inputted into the first end-to-end model to obtain the acoustic feature sequence. In an embodiment of the present disclosure, at the same time or afterward, a text feature of the data to be processed may be acquired by using an embedding layer of the second end-to-end model, then a duration feature of the data to be processed may be acquired, and the text feature and the duration feature are inputted into the second end-to-end model to obtain the gesture feature sequence. Of course, the previously acquired text feature and duration feature may also be directly inputted into the second end-to-end model to obtain the gesture feature sequence. In the present disclosure, the first end-to-end model and the second end-to-end model may process data at the same time, or the first end-to-end model may process data first, or the second end-to-end model may process data first, which is not particularly limited in this specification.

In an embodiment of the present disclosure, the duration feature may be used to represent a duration of a phoneme corresponding to a text. The duration feature can reflect the cadence and inflection in speech, and therefore can improve the expressiveness and naturalness of synthetic speech. In some embodiments, the duration feature corresponding to the data to be processed may be determined using a duration model. The input of the duration model may be a phoneme feature with accent labels, and the output of the duration model is a phoneme duration. The duration model may be obtained by learning speech samples with duration information, and may be, for example, a deep learning model such as convolutional neural network (CNN) and a deep neural network (DNN). The duration model is not particularly limited in the embodiments of the present disclosure.

After the gesture feature sequence is acquired, the obtained gesture feature sequence is inputted into a trained muscle model, and a digital human is driven through the muscle model, so as to drive the digital human to express semantics of the data to be processed through gesture actions, that is, output the data to be processed through sign language.

The gesture feature may convey a thought of a person through the coordinated activities of hands, and express a feeling together with a facial expression.

In an embodiment of the present disclosure, before the trained muscle model is used, model training needs to be performed to obtain the trained muscle model. After the trained muscle model is obtained, the text feature of the data to be processed is processed by using the trained muscle model.

In an embodiment of the present disclosure, during the model training to obtain the trained muscle model, a muscle model is first created according to muscles at fingers of a human, and then training samples are obtained. The training samples may be real-person video data and real-person action data. For each training sample in a training sample set, training steps are as follows.

First, step C1 is performed to obtain a finger muscle feature of each training sample. Then step C2 is performed to train the muscle model by using the finger muscle feature of each training sample. After the training is completed, step C3 is performed to verify the muscle model obtained after the training by using verification samples. After it is determined that the muscle model obtained after the training meets a verification requirement, the muscle model obtained after the training is tested with testing samples. If the muscle model obtained after the training meets a test condition, the trained muscle model is obtained.

If the muscle model obtained after the training fails to meet the verification requirement, the muscle model is trained again using training samples until the muscle model obtained after the training meets the verification requirement. The muscle model that meets the verification requirement is tested until the muscle model obtained after the training meets both the verification requirement and the test condition; then the muscle model obtained after the training is used as a final model, i.e., the trained muscle model.

During the creation of the muscle model, taking the finger muscle feature as an example, an approximate abstraction of muscle control is implemented using a polygonal network, where two types of muscles may be used: linear muscles for stretching, and sphincter muscles for squeezing. The two types of muscles are only connected to a grid space at one point and have a direction specified (an angular displacement and a radial displacement at a certain point are calculated when the two types of muscles are deformed), so the control of the muscles is independent of the specific facial topology, allowing the facial expression to be more realistic and detailed. In an embodiment of the present disclosure, for finger muscles, an approximate abstraction of muscle control is also implemented using a polygonal network, so as to ensure more accurate gesture actions.

Because a self-attention mechanism adopted by the feedforward transformer of the end-to-end model is an innovative method to understand a current word through its context, the ability to extract semantic features is enhanced. In practical applications, this characteristic means that for a homophone in a sentence, the new algorithm can determine which word the homophone is (for example, meet and meat) based on words around the homophone and sentences before and after this sentence, so as to obtain a more accurate result. Moreover, the end-to-end model solves the problem that different parts of existing speech recognition solutions have independent tasks and cannot be jointly optimized. The framework of a single neural network becomes simpler. As the number of model layers and the volume of training data increase, a higher accuracy is achieved. Thirdly, the end-to-end model adopts a new neural network structure, which can better utilize and adapt to the parallel computing power of new hardware (such as GPUs) to achieve faster computing. This means that the algorithm model based on the new network structure requires a shorter time to transcribe speech of a same duration than that required by existing technologies, and can better meet the needs of real-time transcription.

In an embodiment of the present disclosure, after data to be processed is acquired, the data to be processed is processed by using an end-to-end model to obtain a gesture feature sequence; then the gesture feature sequence is inputted into a trained muscle model, and a digital human is driven through the muscle model. Because the input of the end-to-end model is raw data of the data to be processed, directly outputting the gesture feature sequence can better utilize and adapt to the parallel computing power of new hardware (such as GPUs) to achieve faster computing, that is, the gesture feature sequence can be acquired in a shorter time. Then the gesture feature sequence is inputted into the muscle model to directly drive the digital human. To be specific, after the digital human is created, the voice output of the digital human is controlled directly through the acoustic feature sequence, and at the same time, facial expressions and gesture actions of the digital human are controlled through the facial feature sequence and the gesture feature sequence. Compared with existing technologies requiring remodeling of the digital human, the present disclosure reduces the amount of calculation and the amount of data transmitted, and also improves the computing efficiency, thereby greatly improving the real-time performance of driving the digital human, so that the digital human can be driven in real time for sign language output.

Moreover, because the end-to-end model uses the duration feature to obtain the gesture feature sequence, and the duration feature can enhance the synchronization of the acoustic feature sequence with the gesture feature sequence, using the gesture feature sequence to drive the digital human on the basis of enhancing the synchronization can achieve a higher precision in matching a voice output of the digital human with a gesture feature.

Method Embodiment 1

Figure 8:
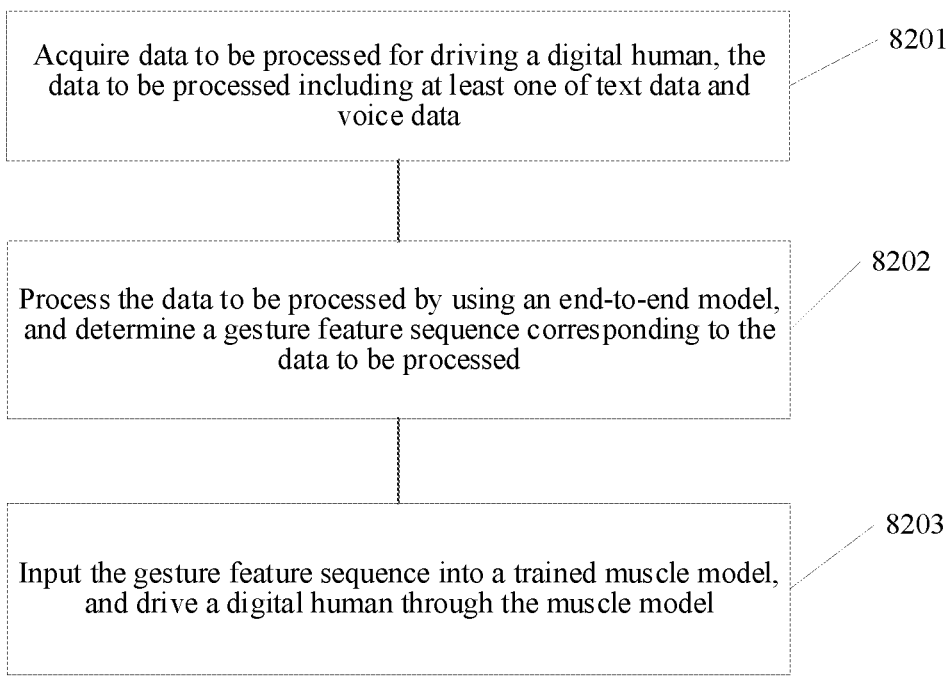
FIG. 8 is a flowchart of a method for driving a digital human in real time according to one or more embodiments of the present disclosure.

Refer to FIG. 8, which is a flowchart of steps of a method for driving a digital human in real time according to an embodiment of the present disclosure, which may specifically include the following steps:

8201: acquiring data to be processed for driving a digital human, the data to be processed including at least one of text data and voice data;

8202: processing the data to be processed by using an end-to-end model, and determining a gesture feature sequence corresponding to the data to be processed; and

8203: inputting the gesture feature sequence into a trained muscle model, and driving a digital human through the muscle model.

Step 8201 includes:

step 82011: acquiring a text feature and a duration feature of the data to be processed; and step 82012: determining the gesture feature sequence according to the text feature and the duration feature.

In step 8201, for a client, the client may receive the data to be processed uploaded by a user; for a server, the server may receive the data to be processed sent by a client. It can be understood that any first device may receive a text to be processed from a second device, and the specific transmission manner of the data to be processed is not limited in the embodiments of the present disclosure.

If the data to be processed is text data, the data to be processed is processed by directly performing step 8202. If the data to be processed is voice data, the data to be processed is converted into text data, and then the text data is processed by performing step S8202.

In step 8202, the end-to-end model needs to be obtained through training first. The end-to-end model includes two training methods, where one of which is for training the end-to-end model to output an acoustic feature sequence, and the other is for training the end-to-end model to output a gesture feature sequence. The end-to-end model may specifically be a fastspeech model.

The trained end-to-end model for outputting an acoustic feature sequence is used as a first end-to-end model. For details of the training process of the first end-to-end model, reference may be made to the description of the above steps A1-A4. The trained end-to-end model for outputting a gesture feature sequence is used as a second end-to-end model. For details of the training process of the second end-to-end model, reference may be made to the description of the above steps B1-B4.

If the end-to-end model is a fastspeech model, after a first fastspeech model and a second fastspeech model are obtained through training, the text feature of the data to be processed is acquired by using any one of the fastspeech models, and then the duration feature is acquired by using a duration model. The duration model may be a deep learning model such as a CNN and a DNN.

Figure 9:
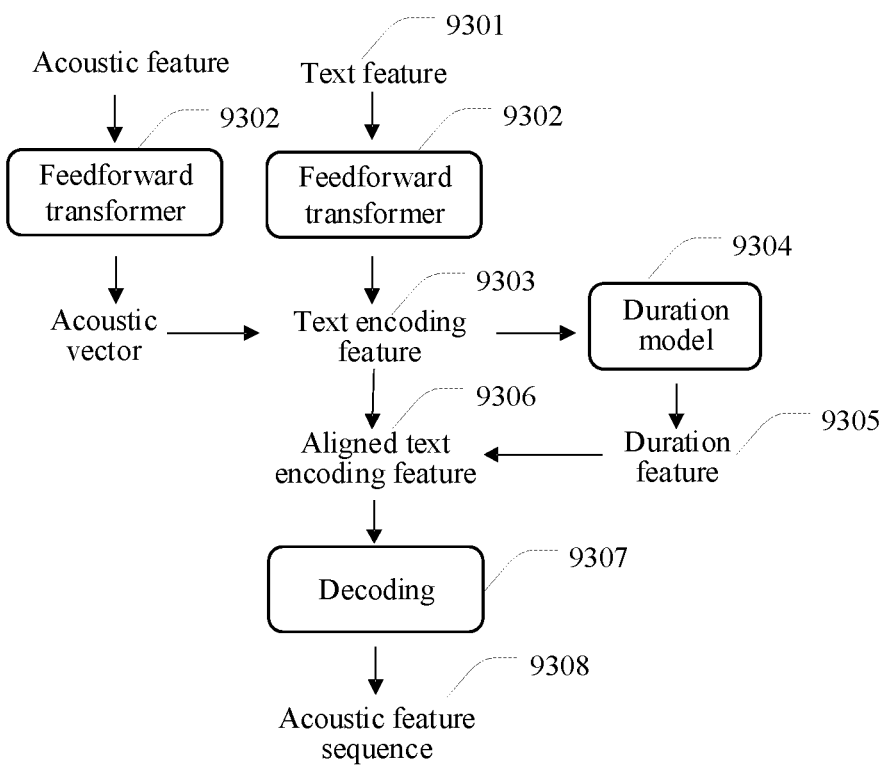
FIG. 9 is a flowchart of steps for outputting an acoustic feature sequence from a first fastspeech model according to one or more embodiments of the present disclosure.

Specifically, as shown in FIG. 9, for example, the acquisition of the gesture feature sequence by the first fastspeech model includes the following steps: acquiring a text feature 9301 of the data to be processed through an embedding layer of the first fastspeech model, encoding the text feature 9301 using a feedforward transformer 9302 to obtain a text encoding feature 9303; processing the text encoding feature 9303 through a duration model 9304 to obtain a duration feature 9305, where the duration feature 9304 may be used to represent a duration of each phoneme in the text encoding feature 30; then, aligning the text encoding feature 9303 according to the duration feature 9305 to obtain an aligned text encoding feature 9306; and decoding 9307 the aligned text encoding feature 9306 and making a prediction to obtain a gesture feature sequence 9307.

In an embodiment of the present disclosure, the text encoding feature 9303 is at the phoneme level, and the aligned text encoding feature 9306 may be at a frame level or the phoneme level, which is not particularly limited in the embodiments of the present disclosure.

In an embodiment of the present disclosure, in the process of obtaining the gesture feature sequence by using the second fastspeech model, a text feature of the data to be processed may be obtained through an embedding layer of the second fastspeech model; then the text feature is encoded through a feedforward transformer to obtain a text encoding feature; the text encoding feature is processed through the duration model to obtain the duration feature, and the text encoding feature is aligned according to the duration feature to obtain an aligned text encoding feature; and the aligned text encoding feature is decoded, and a gesture prediction is made to obtain a gesture feature sequence.

Alternatively, the acoustic feature sequence may be acquired by using the first fastspeech model, the duration feature is acquired by using the duration model, and the acoustic feature sequence is aligned with the gesture feature sequence based on the duration feature, so that when the acoustic feature sequence and the gesture feature sequence are inputted into the muscle model to drive the digital human, voice broadcast and sign language broadcast of the digital human are kept synchronous.

Next, step S8203 is performed to input the gesture feature sequence into a trained muscle model, and drive a digital human through the muscle model, so as to drive the digital human to output the data to be processed through sign language.

In an embodiment of the present disclosure, the acoustic feature sequence is aligned with the gesture feature sequence based on the duration feature, so that when the acoustic feature sequence and the gesture feature sequence are inputted into the muscle model to drive the digital human, voice broadcast and sign language broadcast of the digital human are kept synchronous.

For example, when the acoustic feature sequence is saying "goodbye", a sign language output of the digital human is "goodbye", thereby maintaining the consistency of voice and sign language. In an embodiment of the present disclosure, when the acoustic feature sequence is saying "a hundred flowers in spring", a sign language output of the digital human is "a hundred flowers in spring", so as to maintain the consistency of voice and sign language.

In an embodiment of the present disclosure, after data to be processed is acquired, the data to be processed is processed by using an end-to-end model to obtain a gesture feature sequence; then the gesture feature sequence is inputted into a trained muscle model, and a digital human is driven through the muscle model. Because the input of the end-to-end model is raw data of the data to be processed, directly outputting the gesture feature sequence can better utilize and adapt to the parallel computing power of new hardware (such as GPUs) to achieve faster computing, that is, the gesture feature sequence can be acquired in a shorter time. Then the gesture feature sequence is inputted into the muscle model to directly drive the digital human. To be specific, after the digital human is created, the voice output of the digital human is controlled directly through the acoustic feature sequence, and at the same time, the gesture action of the digital human is controlled through the facial feature sequence and the gesture feature sequence. Compared with existing technologies requiring remodeling of the digital human, the present disclosure reduces the amount of calculation and the amount of data transmitted, and also improves the computing efficiency, thereby greatly improving the real-time performance of driving the digital human, so that the digital human can be driven in real time for sign language output.

Moreover, because the end-to-end model uses the duration feature to obtain the gesture feature sequence, and the duration feature can enhance the synchronization of the acoustic feature sequence with the gesture feature sequence, using the gesture feature sequence to drive the digital human on the basis of enhancing the synchronization can achieve a higher precision in matching a voice output with a sign language output of the digital human.

Method Embodiment 2

Figure 10:
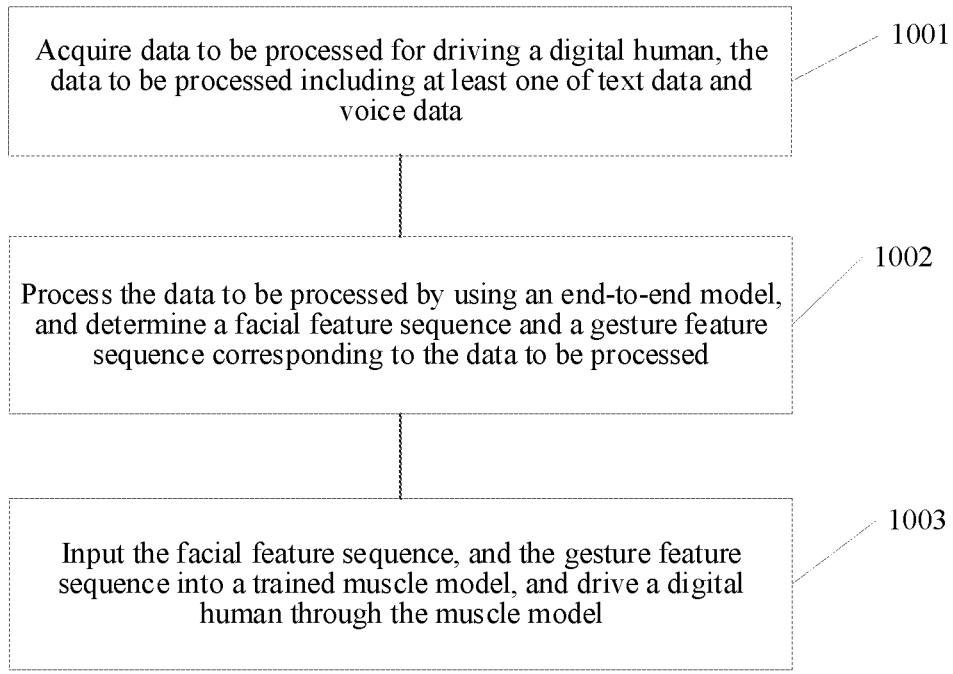
FIG. 10 is another flowchart of a method for driving a digital human in real time according to one or more embodiments of the present disclosure.

Refer to FIG. 10, which is a flowchart of steps of a method for driving a digital human in real time according to an embodiment of the present disclosure, which may specifically include the following steps:

1001: acquiring data to be processed for driving a digital human, the data to be processed including at least one of text data and voice data;

1002: processing the data to be processed by using an end-to-end model, and determining a facial feature sequence and a gesture feature sequence corresponding to the data to be processed; and

1003: inputting the facial feature sequence and the gesture feature sequence into a trained muscle model, and driving a digital human through the muscle model.

Step 1001 includes:

step 10011: acquiring a text feature and a duration feature of the data to be processed;

step 10012: determining the facial feature sequence and the gesture feature sequence according to the text feature and the duration feature.

In step 1001, for a client, the client may receive the data to be processed uploaded by a user; for a server, the server may receive the data to be processed sent by a client. It can be understood that any first device may receive a text to be processed from a second device, and the specific transmission manner of the data to be processed is not limited in the embodiments of the present disclosure.

If the data to be processed is text data, the data to be processed is processed by directly performing step 1002. If the data to be processed is voice data, the data to be processed is converted into text data, and then the text data is processed by performing step 1002.

In step 1002, first the model for outputting a facial feature sequence and a gesture feature sequence need to be obtained through training. In this case, training samples for training the end-to-end model for outputting a facial feature sequence and a gesture feature sequence may be real-person video data and real-person action data. For each training sample in a training sample set, specific training steps are as follows. Step D1 is first performed to obtain a facial feature, a gesture feature, and a text feature of the training sample. The text feature may be at the phoneme level. Specifically, feature data of the training sample may be mapped to an embedding layer in the end-to-end model to obtain the facial feature, the gesture feature, and the text feature. Then step D2 is performed to process the facial feature, the gesture feature, and the text feature by using a feedforward transformer to obtain a facial feature vector, a gesture feature vector, and a text encoding feature. The facial feature vector is used for representing a feature of a facial expression. The gesture feature vector may be a muscle action vector. The text encoding feature is also at the phoneme level. Next, step D3 is performed to align the facial feature vector and the gesture feature vector with the text encoding feature. A duration predictor may be used to align the facial feature vector and the gesture feature vector with the text encoding feature. The text encoding feature is specifically a phoneme feature. Next, step D4 is performed to acquire a facial feature sequence and a gesture feature sequence. In this case, a length adjuster may be used to align facial expressions and gesture actions by extending or shortening the phoneme duration, so as to obtain the facial feature sequence and the gesture feature sequence.

In an embodiment of the present disclosure, the text feature may include a phoneme feature and/or a semantic feature, and the like. Further, a phoneme is the smallest phonetic unit of speech divided according to natural properties. As analyzed according to pronunciation actions in syllables, one action constitutes one phoneme. Phonemes may include vowels and consonants. In some embodiments, a specific phoneme feature corresponds to a specific lip feature, facial expression feature, or gesture feature, etc.

Semantics refers the meanings of concepts represented by objects in the real world that correspond to a text to be processed, and the relationship between these meanings, and is an interpretation and logical representation of the text to be processed in a certain field. In some embodiments, a specific semantic feature corresponds to a specific gesture feature, etc.

A training sample set for training the end-to-end model for outputting a facial feature sequence and a gesture feature sequence includes real-person action data or real-person video data. For the training process of the end-to-end model for outputting a facial feature sequence and a gesture feature sequence, reference may be made to the training process of the end-to-end model for outputting an acoustic feature sequence, and the details will not be repeated herein for the sake of brevity.

After the end-to-end model for outputting a facial feature sequence and a gesture feature sequence is obtained by training, the obtained end-to-end model for outputting a facial feature sequence and a gesture feature sequence is used as a third end-to-end model.

Accordingly, after data to be processed is obtained, a text feature of the data to be processed may be acquired by using an embedding layer of the third end-to-end model, then a duration feature of the data to be processed may be acquired, and the text feature and the duration feature are inputted into the third end-to-end model to obtain the facial feature sequence and the gesture feature sequence.

In addition, after data to be processed is obtained, a text feature of the data to be processed may be acquired by using an embedding layer of the third end-to-end model, then a duration feature of the data to be processed may be acquired, and the text feature and the duration feature are inputted into the third end-to-end model to obtain the facial feature sequence and the gesture feature sequence.

Of course, after data to be processed is obtained, a text feature of the data to be processed may be acquired by using an embedding layer of the first end-to-end model, then a duration feature of the data to be processed may be acquired, and the text feature and the duration feature are inputted into the first end-to-end model to obtain the acoustic feature sequence. In an embodiment of the present disclosure, at the same time or afterward, a text feature of the data to be processed may be acquired by using an embedding layer of the third end-to-end model, then a duration feature of the data to be processed may be acquired, and the text feature and the duration feature are inputted into the second end-to-end model to obtain the facial feature sequence and the gesture feature sequence. Of course, the previously acquired text feature and duration feature may also be directly inputted into the third end-to-end model to obtain the facial feature sequence and the gesture feature sequence. In some embodiments of the present disclosure, the first end-to-end model and the third end-to-end model may process data at the same time, or the first end-to-end model may process data first, or the third end-to-end model may process data first, which is not particularly limited in this specification.

In an embodiment of the present disclosure, the duration feature may be used to represent a duration of a phoneme corresponding to a text. The duration feature can reflect the cadence and inflection in speech, and therefore can improve the expressiveness and naturalness of synthetic speech. In some embodiments, the duration feature corresponding to the data to be processed may be determined using a duration model. The input of the duration model may be a phoneme feature with accent labels, and the output of the duration model is a phoneme duration. The duration model may be obtained by learning speech samples with duration information, and may be, for example, a deep learning model such as convolutional neural network (CNN) and a deep neural network (DNN). The duration model is not particularly limited in the present disclosure.

After the facial feature sequence and the gesture feature sequence are acquired, the obtained facial feature sequence and gesture feature sequence are inputted into a trained muscle model, and a digital human is driven through the muscle model, so as to drive the digital human to express semantics of the data to be processed through gesture actions, that is, output the data to be processed through sign language. The digital human presents different facial expression features according to the semantics of the data to be processed.

In some embodiments of the present disclosure, facial features include a facial expression feature and a lip feature. The facial expression is used to express a feeling or affection, and may refer to a thought or feeling expressed on the face. The facial expression feature is usually for the entire face. The lip feature may be specifically for the lip, and is related to text content of the text, voice, pronunciation, etc. Therefore, facial features can be used to make a facial expression more realistic and detailed.

In some embodiments of the present disclosure, the acoustic feature sequence may be acquired by using the first fastspeech model, the duration feature is acquired by using the duration model, and the acoustic feature sequence is aligned with the facial feature sequence and the gesture feature sequence based on the duration feature, so that when the acoustic feature sequence, the facial feature sequence, and the gesture feature sequence are inputted into the muscle model to drive the digital human, voice broadcast and is kept synchronous with facial expressions and sign language broadcast of the digital human.

In an embodiment of the present disclosure, in the process of obtaining the gesture feature sequence by using the third fastspeech model, a text feature of the data to be processed may be obtained through an embedding layer of the third fastspeech model; then the text feature is encoded through a feedforward transformer to obtain a text encoding feature; the text encoding feature is processed through the duration model to obtain the duration feature, and the text encoding feature is aligned according to the duration feature to obtain an aligned text encoding feature; and the aligned text encoding feature is decoded, and a face prediction and a gesture prediction are made to obtain a facial feature sequence and a gesture feature sequence.

Alternatively, the acoustic feature sequence may be acquired by using the first fastspeech model, the duration feature is acquired by using the duration model, and the acoustic feature sequence is aligned with the facial feature sequence and the gesture feature sequence based on the duration feature, so that when the acoustic feature sequence, the facial feature sequence, and the gesture feature sequence are inputted into the muscle model to drive the digital human, voice broadcast and is kept synchronous with facial expressions and sign language broadcast of the digital human.

Next, step 8203 is performed to input the facial feature sequence and the gesture feature sequence into a trained muscle model, and drive a digital human through the muscle model, so as to drive the digital human to control facial expressions and output sign language at the same time.

In an embodiment of the present disclosure, the acoustic feature sequence is aligned with the gesture feature sequence based on the duration feature, so that when the acoustic feature sequence and the gesture feature sequence are inputted into the muscle model to drive the digital human, voice broadcast and sign language broadcast of the digital human are kept synchronous.

For example, when the acoustic feature sequence is saying "goodbye", a sign language output of the digital human is "goodbye" and a smile is shown on the face, thereby maintaining the consistency of voice, the facial expression, and sign language. In an embodiment of the present disclosure, when the acoustic feature sequence is saying "someone is injured", a sign language output of the digital human is "someone is injured" and sadness is shown on the face, thereby maintaining the consistency of voice, the facial expression, and sign language.

In an embodiment of the present disclosure, after data to be processed is acquired, the data to be processed is processed by using an end-to-end model to obtain facial feature sequence and a gesture feature sequence; then the facial feature sequence and the gesture feature sequence are inputted into a trained muscle model, and a digital human is driven through the muscle model. Because the input of the end-to-end model is raw data of the data to be processed, directly outputting the facial feature sequence and the gesture feature sequence can better utilize and adapt to the parallel computing power of new hardware (such as GPUs) to achieve faster computing, that is, the facial feature sequence and the gesture feature sequence can be acquired in a shorter time. Then the facial feature sequence and the gesture feature sequence are inputted into the muscle model to directly drive the digital human. To be specific, after the digital human is created, the voice output of the digital human is controlled through the acoustic feature sequence, and at the same time, facial expressions and gesture actions of the digital human are controlled through the facial feature sequence and the gesture feature sequence. Compared with existing technologies requiring remodeling of the digital human, the present disclosure reduces the amount of calculation and the amount of data transmitted, and also improves the computing efficiency, so that the digital human can be driven in real time for sign language output.

Moreover, because the end-to-end model uses the duration feature to obtain the facial feature sequence and the gesture feature sequence, and the duration feature can enhance the synchronization of the acoustic feature sequence with the facial feature sequence and the gesture feature sequence, using the facial feature sequence and the gesture feature sequence to drive the digital human on the basis of enhancing the synchronization can achieve a higher precision in matching a voice output with a facial expression and sign language.

Apparatus Embodiment

Figure 11:
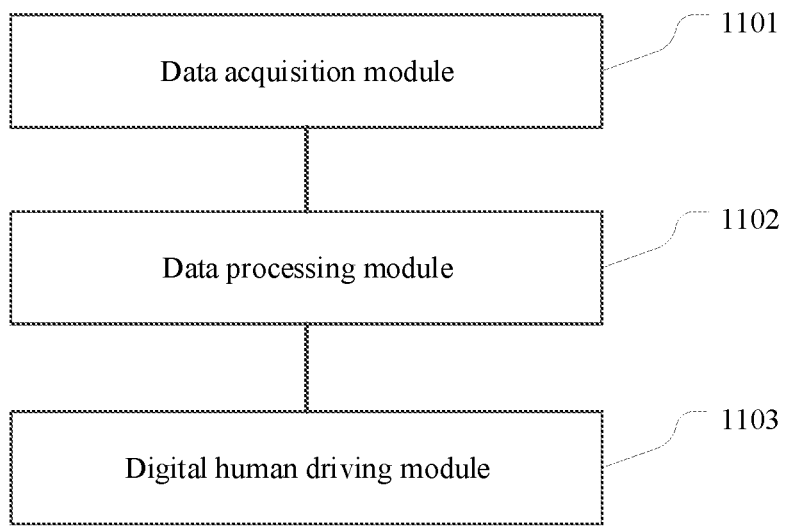
FIG. 11 is a schematic structural diagram of an apparatus for driving a digital human in real time according to one or more embodiments of the present disclosure.

Refer to FIG. 11, which is a structural block diagram of an apparatus for driving a digital human in real time according to some embodiments of the present disclosure, which may include:

- a data acquisition module 1101, configured to acquire data to be processed for driving a digital human, the data to be processed including at least one of text data and voice data;
- a data processing module 1102, configured to process the data to be processed by using an end-to-end model, and determine a gesture feature sequence corresponding to the data to be processed; and
- a digital human driving module 1103, configured to input the gesture feature sequence into a trained muscle model, and drive a digital human through the muscle model, The data processing module 1102 is further configured to: acquire a text feature and a duration feature of the data to be processed; and determine the gesture feature sequence according to the text feature and the duration feature.

In some embodiments, the data processing module 1102 is configured to acquire the text feature through a fastspeech model; and acquire the duration feature through a duration model, the duration model being a deep learning model.

In some embodiments, the data processing module 1102 is configured to, when the fastspeech model outputs a facial feature sequence and a gesture feature sequence, input the text feature and the duration feature into the fastspeech model to obtain the facial feature sequence and the gesture feature sequence.

In some embodiments, the digital human driving module 1103 is configured to fuse the facial feature sequence and the gesture feature sequence to obtain a fused feature sequence; and input the fused feature sequence into the muscle model.

In some embodiments, the digital human driving module 1103 is configured to fuse the facial feature sequence and the gesture feature sequence based on the duration feature to obtain the fused feature sequence.

In some embodiments, facial features corresponding to the facial feature sequence include an expression feature and a lip feature.

The apparatus embodiments are substantially similar to the method embodiments and therefore are only briefly described, and reference may be made to the description of the parts of the method embodiments for the associated parts.

The embodiments in the present disclosure are described in a progressive manner. Each embodiment focuses on a difference from other embodiments. Refer to these embodiments for same or similar parts in the embodiments.

For the apparatus in the foregoing embodiments, a specific manner in which each module performs an operation is already described in detail in the embodiments related to the method, and details are not described herein again.

Figure 12:
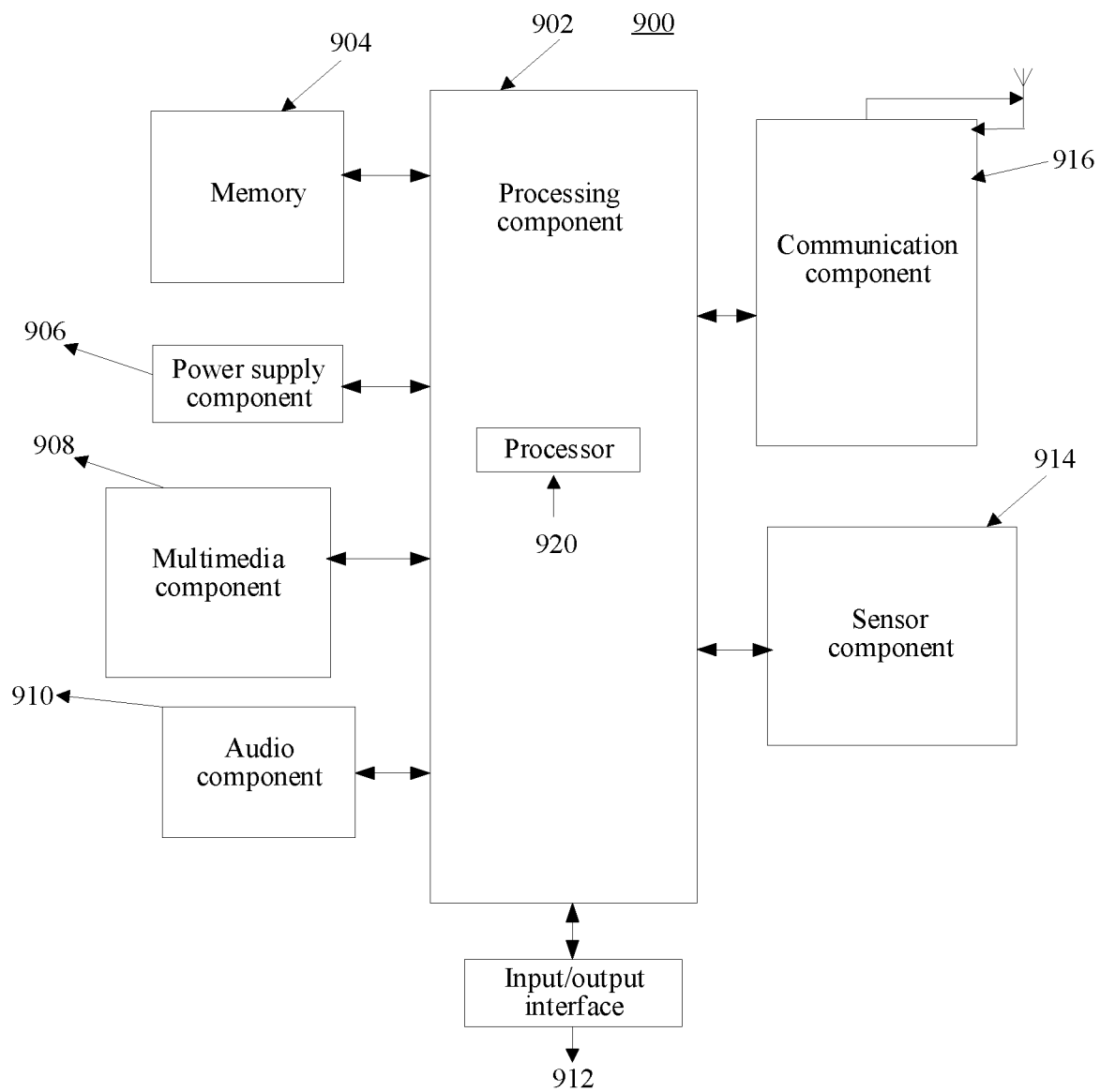
FIG. 12 is a structural block diagram of an apparatus for driving a digital human in real time as a device according to one or more embodiments of the present disclosure.

FIG. 12 is a structural block diagram of an apparatus for driving a digital human in real time as a device according to some embodiments of the present disclosure. For example, the apparatus 900 may be a mobile phone, a computer, a digital broadcasting terminal, a messaging device, a game console, a tablet device, a medical device, a fitness facility, a personal digital assistant, or the like.

Referring to FIG. 12, the apparatus 900 may include one or more of the following components: a processing component 902, a memory 904, a power supply component 906, a multimedia component 908, an audio component 910, an input/output (I/O) interface 912, a sensor component 914, and a communication component 916.

The processing component 902 usually controls the whole operation of the apparatus 900, such as operations associated with displaying, an incoming call, data communication, a camera operation, and a recording operation. The processing component 902 may include one or more processors 920 to execute instructions, to complete all or some steps of the foregoing method. In addition, the processing component 902 may include one or more modules, to facilitate the interaction between the processing component 902 and other components. For example, the processing component 902 may include a multimedia module, to facilitate the interaction between the multimedia component 908 and the processing component 902.

The memory 904 is configured to store data of various types to support operations on the device 900. Examples of the data include instructions, contact data, call book data, messages, pictures, videos, and the like of any application program or method used to be operated on the apparatus 900. The memory 904 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 906 provides power to various components of the apparatus 900. The power supply component 906 may include a power supply management system, one or more power supplies, and other components associated with generating, managing and allocating power for the apparatus 900.

The multimedia component 908 includes a screen providing an output interface between the apparatus 900 and a user. In some embodiments, the screen may include a liquid crystal display (LCD) and a touch panel (TP). If the screen includes a TP, the screen may be implemented as a touchscreen to receive an input signal from the user. The touch panel includes one or more touch sensors to sense a touch, a slide, and a gesture on the touch panel. The touch sensor may not only sense a boundary of the touch or slide movement, but also detect duration and pressure related to the touch or slide operation. In some embodiments, the multimedia component 908 includes a front camera and/or a rear camera. When the device 900 is in an operating mode, such as a shooting mode or a video mode, the front-facing camera and/or the rear-facing camera may receive external multimedia data. Each front camera and rear camera may be a fixed optical lens system or have a focal length and an optical zooming capability.

The audio component 910 is configured to output and/or input an audio signal. For example, the audio component 910 includes a microphone (MIC), and when the apparatus 900 is in an operation mode, such as a call mode, a recording mode, and a voice identification mode, the MIC is configured to receive an external audio signal. The received audio signal may further be stored in the memory 904 or sent through the communication component 916. In some embodiments, the audio component 910 further includes a speaker, configured to output an audio signal.

The I/O interface 912 provides an interface between the processing component 902 and an external interface module. The external interface module may be a keyboard, a click wheel, buttons, or the like. The buttons may include, but not limited to a homepage button, a volume button, a start-up button, and a locking button.

The sensor component 914 includes one or more sensors, configured to provide status evaluation in each aspect to the apparatus 900. For example, the sensor component 914 may detect an opened/closed status of the apparatus 900, and relative positioning of the component. For example, the component is a display and a small keyboard of the apparatus 900. The sensor component 914 may further detect the position change of the apparatus 900 or one component of the apparatus 900, the existence or nonexistence of contact between the user and the apparatus 900, the azimuth or acceleration/deceleration of the apparatus 900, and the temperature change of the apparatus 900. The sensor component 914 may include a proximity sensor, configured to detect the existence of nearby objects without any physical contact. The sensor component 914 may further include an optical sensor, such as a CMOS or CCD image sensor, which is used in an imaging application. In some embodiments, the sensor component 914 may further include an acceleration sensor, a gyroscope sensor, a magnetic sensor, a pressure sensor, or a temperature sensor.

The communication component 916 is configured to facilitate communication in a wired or wireless manner between the apparatus 900 and other devices. The apparatus 900 may access a wireless network based on communication standards, such as Wi-Fi, 2G, or 3G, or a combination thereof. In an exemplary embodiment, the communication component 916 receives a broadcast signal or broadcast related information from an external broadcast management system via a broadcast channel. In an exemplary embodiment, the communication component 916 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In some embodiments, the apparatus 900 can be implemented as one or more application specific integrated circuit (ASIC), a digital signal processor (DSP), a digital signal processing device (DSPD), a programmable logic device (PLD), a field programmable gate array (FPGA), a controller, a micro-controller, a microprocessor or other electronic element, so as to perform the foregoing method.

Another aspect of the present disclosure provides a non-transitory computer readable storage medium including instructions, for example, a memory 904 including instructions, is further provided, and the foregoing instructions may be executed by a processor 920 of the apparatus 900 to complete the foregoing method. For example, the non-temporary computer-readable storage medium may be a ROM, a random access memory (RAM), a CD-ROM, a magnetic tape, a floppy disk, an optical data storage device, or the like.

Figure 13:
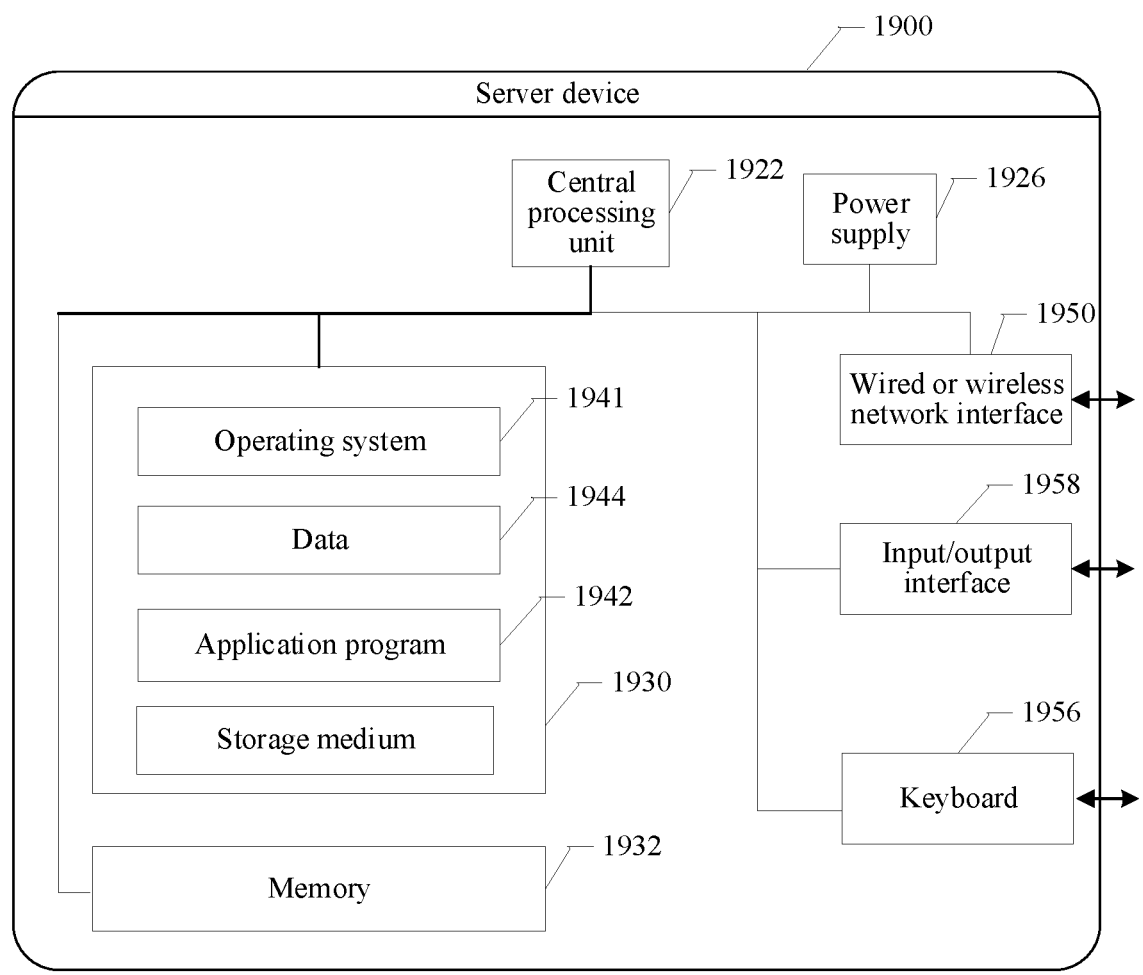
FIG. 13 is a structural block diagram of a server according to one or more embodiments of the present disclosure.

FIG. 13 is a structural block diagram of a server according to some embodiments of the present disclosure. The server 1900 may vary due to different configurations or performance, and may include one or more central processing units (CPU) 1922 (for example, one or more processors) and memories 1932, and one or more storage media 1930 (for example, one or more mass storage devices) storing an application program 1942 or data 1944. The memory 1932 and the storage medium 1930 may be transient storage or persistent storage. The program stored in the storage medium 1930 may include one or more modules (not marked in the figure), and each module may include a series of instruction operations to the server. Further, the central processing unit 1922 may be configured to communicate with the storage medium 1930 to perform the series of instruction operations in the storage medium 1930 on the server 1900.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

Embodiments of the present disclosure provide a non-transitory computer-readable storage medium, storing instructions that, when executed by a processor of an apparatus (device or server), cause the apparatus to perform a method for driving a digital human in real time, the method including: determining a duration feature corresponding to a text to be processed, the text to be processed involves at least two languages; determining a target speech sequence corresponding to the text to be processed according to the duration feature; determining a target image sequence corresponding to the text to be processed according to the duration feature, the target image sequence being obtained according to a text sample and an image sample corresponding to the text sample, languages corresponding to the text sample including all the languages involved in the text to be processed; and fusing the target speech sequence and the target image sequence to obtain a corresponding target video.

To solve the technical problem that it takes a lot of time to drive a digital human, a solution for driving a digital human in real time is provided according to one or more embodiments of the present disclosure. This solution is used for driving a digital human in real time, and may specifically include: acquiring data to be processed for driving a digital human, the data to be processed including at least one of text data and voice data; processing the data to be processed by using an end-to-end model, and determining an acoustic feature sequence, a facial feature sequence, and a limb feature sequence corresponding to the data to be processed; and inputting the acoustic feature sequence, the facial feature sequence, and the limb feature sequence into a trained muscle model, and driving a digital human through the muscle model, the processing the data to be processed by using an end-to-end model, and determining an acoustic feature sequence, a facial feature sequence, and a limb feature sequence corresponding to the data to be processed including: acquiring a text feature and a duration feature of the data to be processed; determining the acoustic feature sequence according to the text feature and the duration feature; and determining the facial feature sequence and the limb feature sequence according to the text feature and the duration feature.

The digital human according to the embodiments of the present disclosure may specifically be a high-simulation digital human which is only slightly different from a real person. The digital human may be applied to content presentation scenarios such as news broadcast scenarios, teaching scenarios, medical scenarios, customer service scenarios, legal scenarios, and conference scenarios.

The data to be processed according to the embodiments of the present disclosure may be text data, voice data, or text data and voice data, which is not particularly limited in this specification.

For example, in a news broadcast scenario, a to-be-broadcast press release for driving a digital human needs to be acquired. In this case, the press release is the data to be processed, and the press release may be a text edited by a human or machine. After the text is edited by the human or machine, the edited text is acquired as the press release.

According to some embodiments of the present disclosure, before the data to be processed is processed by using the end-to-end model, the end-to-end model needs to be trained through samples to obtain a trained end-to-end model. After the trained end-to-end model is obtained, the data to be processed is processed by using the trained end-to-end model.

In some embodiments of the present disclosure, the end-to-end model includes two training methods, where one of which is for training the end-to-end model to output an acoustic feature sequence, and the other is for training the end-to-end model to output a facial feature sequence and a limb feature sequence. The end-to-end model may specifically be a fastspeech model.

Figure 14:
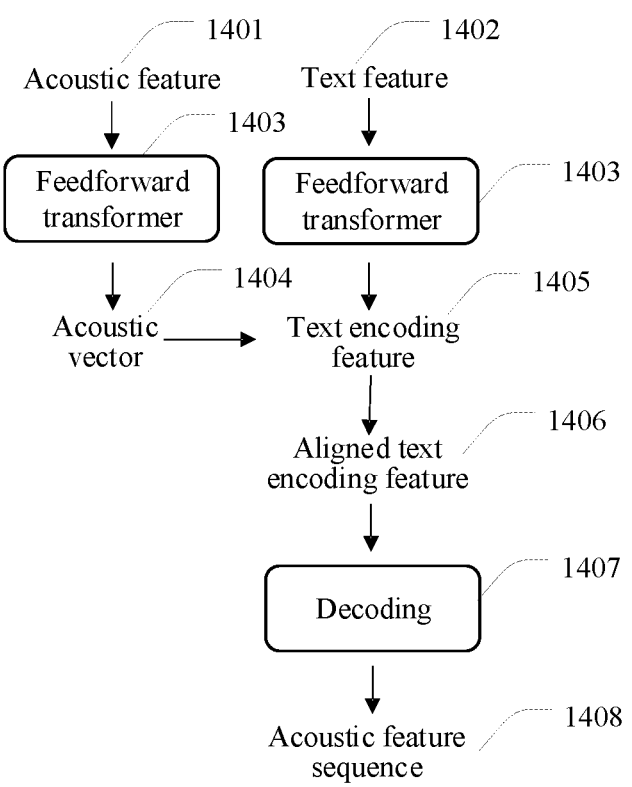
FIG. 14 is a training flowchart for training an end-to-end model according to one or more embodiments of the present disclosure.

In some embodiments of the present disclosure, training samples for training the end-to-end model for outputting an acoustic feature sequence may be text and voice data, or may be video data. For each training sample in a training sample set, specific training steps are shown in FIG. 14. Step A1 is first performed to obtain an acoustic feature 1401 and a text feature 1402 of the training sample. The text feature 1401 may be at a phoneme level.

In an embodiment of the present disclosure, feature data of the training sample may be mapped to an embedding layer in the end-to-end model to obtain the acoustic feature 1401 and the text feature 1402. Then step A2 is performed to process the acoustic feature 1401 and the text feature 1402 by using a feedforward transformer 1403 to obtain an acoustic vector 1404 and a text encoding feature 1405. The acoustic vector 1404 may be an acoustic vector of a sentence, or an acoustic vector of a word. The text encoding feature 1405 is also at the phoneme level. Next, step A3 is performed to align the acoustic vector 1404 and the text encoding feature 1405 to obtain an aligned text encoding feature 1406. A duration predictor may be used to align the acoustic vector 1404 and the text encoding feature 1405. The text encoding feature 1405 is specifically a phoneme feature, and the acoustic vector 1404 may be a mel spectrogram, in which case the phoneme feature and the mel spectrogram may be aligned using the duration predictor. Next, step A4 is performed to decode 1407 the aligned text encoding features 1406 to obtain an acoustic feature sequence 1408. In this case, a length adjuster may be used to easily determine a speech speed by extending or shortening the phoneme duration, so as to determine a length of the generated mel spectrogram; and a space may be added between adjacent phonemes to control part of prosody. The acoustic feature sequence is obtained according to the determined length of the mel spectrogram and the space between phonemes.

A training sample set for training the end-to-end model for outputting an acoustic feature sequence may contain, for example, 13,100 audio clips and corresponding text recordings, with a total audio length of about 24 hours. In this case, the training sample set is randomly divided into three groups: 12500 samples for training, 300 samples for verification, and 300 samples for testing. To alleviate the problem of mispronunciation, a phoneme conversion tool is used to convert text sequences to phoneme sequences. For voice data, an original waveform is converted to a mel spectrogram. Then the end-to-end model is trained using 12500 samples, and after the training is complete, the trained end-to-end model is verified using the 300 verification samples. After it is determined that the end-to-end model obtained after the training meets a verification requirement, the end-to-end model obtained after the training is tested with the 300 testing samples. If the end-to-end model obtained after the training meets a test condition, the trained end-to-end model is obtained.

If the end-to-end model fails to meet the verification requirement, the end-to-end model is trained again using training samples until the end-to-end model obtained after the training meets the verification requirement. The end-to-end model that meets the verification requirement is tested until the end-to-end model obtained after the training meets both the verification requirement and the test condition; then the end-to-end model obtained after the training is used as a final model, i.e., the trained end-to-end model.

Training samples for training the end-to-end model for outputting a facial feature sequence and a limb feature sequence may be real-person video data and real-person action data. For each training sample in a training sample set, specific training steps are as follows. Step B1 is first performed to obtain a facial feature, a limb feature, and a text feature of the training sample. The text feature may be at the phoneme level.

In an embodiment of the present disclosure, feature data of the training sample may be mapped to an embedding layer in the end-to-end model to obtain the facial feature, the limb feature, and the text feature. Then step B2 is performed to process the facial feature, the limb feature, and the text feature by using a feedforward transformer to obtain a facial feature vector, a limb feature vector, and a text encoding feature. The facial feature vector is used for representing a feature of a facial expression. The limb feature vector may be a muscle action vector. The text encoding feature is also at the phoneme level. Next, step B3 is performed to align the facial feature vector and the limb feature vector with the text encoding feature. A duration predictor may be used to align the facial feature vector and the limb feature vector with the text encoding feature. The text encoding feature is specifically a phoneme feature. Next, step B4 is performed to acquire a facial feature sequence and a limb feature sequence. In this case, a length adjuster may be used to align facial expressions and actions by extending or shortening the phoneme duration, so as to obtain the facial feature sequence and the limb feature sequence.

In an embodiment of the present disclosure, the text feature may include a phoneme feature and/or a semantic feature, and the like. In some embodiments, a phoneme is the smallest phonetic unit of speech divided according to natural properties. As analyzed according to pronunciation actions in syllables, one action constitutes one phoneme. Phonemes may include vowels and consonants. In some embodiments, a specific phoneme feature corresponds to a specific lip feature, facial expression feature, or limb feature, etc.

Semantics refers the meanings of concepts represented by objects in the real world that correspond to a text to be processed, and the relationship between these meanings, and is an interpretation and logical representation of the text to be processed in a certain field. In some embodiments, a specific semantic feature corresponds to a specific limb feature, etc.

A training sample set for training the end-to-end model for outputting a facial feature sequence and a limb feature sequence includes real-person action data or real-person video data. For the training process of the end-to-end model for outputting a facial feature sequence and a limb feature sequence, reference may be made to the training process of the end-to-end model for outputting an acoustic feature sequence, and the details will not be repeated herein for the sake of brevity.

After the end-to-end model for outputting an acoustic feature sequence and the end-to-end model for outputting a facial feature sequence and a limb feature sequence are obtained by training, the obtained end-to-end model for outputting an acoustic feature sequence is used as a first end-to-end model, and the obtained end-to-end model for outputting a facial feature sequence and a limb feature sequence is used as a second end-to-end model.

Accordingly, after data to be processed is obtained, a text feature of the data to be processed may be acquired by using an embedding layer of the first end-to-end model, then a duration feature of the data to be processed may be acquired, and the text feature and the duration feature are inputted into the first end-to-end model to obtain the acoustic feature sequence. In an embodiment of the present disclosure, a text feature of the data to be processed may be acquired by using an embedding layer of the second end-to-end model, then a duration feature of the data to be processed may be acquired, and the text feature and the duration feature are inputted into the second end-to-end model to obtain the facial feature sequence and the limb feature sequence. Of course, the previously acquired text feature and duration feature may also be directly inputted into the second end-to-end model to obtain the facial feature sequence and the limb feature sequence. In an embodiment of the present disclosure, the first end-to-end model and the second end-to-end model may process data at the same time, or the first end-to-end model may process data first, or the second end-to-end model may process data first, which is not particularly limited in this specification.

In an embodiment of the present disclosure, the duration feature may be used to represent a duration of a phoneme corresponding to a text. The duration feature can reflect the cadence and inflection in speech, and therefore can improve the expressiveness and naturalness of synthetic speech. In some embodiments, the duration feature corresponding to the data to be processed may be determined using a duration model. The input of the duration model may be a phoneme feature with accent labels, and the output of the duration model is a phoneme duration. The duration model may be obtained by learning speech samples with duration information, and may be, for example, a deep learning model such as convolutional neural network (CNN) and a deep neural network (DNN). The duration model is not particularly limited in the embodiments of the present disclosure.

After the acoustic feature sequence, the facial feature sequence, and the limb feature sequence are acquired, the acquired acoustic feature sequence, facial feature sequence, and limb feature sequence are inputted into the trained muscle model, and the digital human is driven through the muscle model.

In one embodiment of the present disclosure, facial features include a facial expression feature and a lip feature. The facial expression is used to express a feeling or affection, and may refer to a thought or feeling expressed on the face. The facial expression feature is usually for the entire face. The lip feature may be specifically for the lip, and is related to text content of the text, voice, pronunciation, etc. Therefore, facial features can be used to make a facial expression more realistic and detailed.

The limb feature may convey a thought of a person through the coordinated activities of the head, eyes, neck, hands, elbows, arms, body, hips, feet, and other parts of the human body, and express a feeling together with a facial expression. The limb feature may include head turning, shrugging, gestures, etc., and can improve the richness of the expression corresponding to an image sequence. For example, at least one arm hangs naturally when speaking, and at least one arm rests naturally on the abdomen when not speaking, etc.

In an embodiment of the present disclosure, before the trained muscle model is used, model training needs to be performed to obtain the trained muscle model. After the trained muscle model is obtained, the acoustic feature sequence, the facial feature sequence, and the limb feature sequence are processed using the trained muscle model.

In an embodiment of the present disclosure, during the model training to obtain the trained muscle model, a muscle model is first created according to facial muscles of the human face and limb muscles, and then training samples are obtained. The training samples may be real-person video data and real-person action data. For each training sample in a training sample set, training steps are as follows.

First, step C1 is performed to obtain a facial muscle feature and a limb muscle feature of each training sample. Then step C2 is performed to train the muscle model by using the facial muscle feature and the limb muscle feature of each training sample. After the training is completed, step C3 is performed to verify the muscle model obtained after the training by using verification samples. After it is determined that the muscle model obtained after the training meets a verification requirement, the muscle model obtained after the training is tested with testing samples. If the muscle model obtained after the training meets a test condition, the trained muscle model is obtained.

If the muscle model obtained after the training fails to meet the verification requirement, the muscle model is trained again using training samples until the muscle model obtained after the training meets the verification requirement. The muscle model that meets the verification requirement is tested until the muscle model obtained after the training meets both the verification requirement and the test condition; then the muscle model obtained after the training is used as a final model, i.e., the trained muscle model.

During the creation of the muscle model, taking facial muscles as an example, an approximate abstraction of muscle control is implemented using a polygonal network, where two types of muscles may be used: linear muscles for stretching, and sphincter muscles for squeezing. The two types of muscles are only connected to a grid space at one point and have a direction specified (an angular displacement and a radial displacement at a certain point are calculated when the two types of muscles are deformed), so the control of the muscles is independent of the specific facial topology, allowing the facial expression to be more realistic and detailed. In an embodiment of the present disclosure, for limb muscles, an approximate abstraction of muscle control is also implemented using a polygonal network, so as to ensure more accurate limb actions.

Because a self-attention mechanism adopted by the feed-forward transformer of the end-to-end model is an innovative method to understand a current word through its context, the ability to extract semantic features is enhanced. In practical applications, this characteristic means that for a homophone in a sentence, the new algorithm can determine which word the homophone is (for example, meet and meat) based on words around the homophone and sentences before and after this sentence, so as to obtain a more accurate result. Moreover, the end-to-end model solves the problem that different parts of existing speech recognition solutions have independent tasks and cannot be jointly optimized. The framework of a single neural network becomes simpler. As the number of model layers and the volume of training data increase, a higher accuracy is achieved. Thirdly, the end-to-end model adopts a new neural network structure, which can better utilize and adapt to the parallel computing power of new hardware (such as GPUs) to achieve faster computing. This means that the algorithm model based on the new network structure requires a shorter time to transcribe speech of a same duration than that required by existing technologies, and can better meet the needs of real-time transcription.

In an embodiment of the present disclosure, after data to be processed is acquired, the data to be processed is processed by using an end-to-end model to obtain an acoustic feature sequence, a facial feature sequence, and a limb feature sequence; then the acoustic feature sequence, the facial feature sequence, and the limb feature sequence are inputted into a trained muscle model, and a digital human is driven through the muscle model. Because the input of the end-to-end model is raw data of the data to be processed, directly outputting the acoustic feature sequence, the facial feature sequence, and the limb feature sequence can better utilize and adapt to the parallel computing power of new hardware (such as GPUs) to achieve faster computing, that is, the acoustic feature sequence, the facial feature sequence, and the limb feature sequence can be acquired in a shorter time. Then the acoustic feature sequence, the facial feature sequence, and the limb feature sequence are inputted into the muscle model to directly drive the digital human. To be specific, after the digital human is created, the voice output of the digital human is controlled directly through the acoustic feature sequence, and at the same time, the facial expression and limb movement of the digital human are controlled through the facial feature sequence and the limb feature sequence. Compared with existing technologies requiring remodeling of the digital human, the present disclosure reduces the amount of calculation and the amount of data transmitted, and also improves the computing efficiency, thereby greatly improving the real-time performance of driving the digital human, so that the digital human can be driven in real time.

Moreover, because the end-to-end model uses the duration feature to obtain the acoustic feature sequence, the facial feature sequence, and the limb feature sequence, and the duration feature can enhance the synchronization of the acoustic feature sequence with the facial feature sequence and the limb feature sequence, using the acoustic feature sequence, the facial feature sequence, and the limb feature sequence to drive the digital human on the basis of enhancing the synchronization can achieve a higher precision in matching a voice output of the digital human with a facial expression and a limb feature.

Method Embodiment 1

Figure 15:
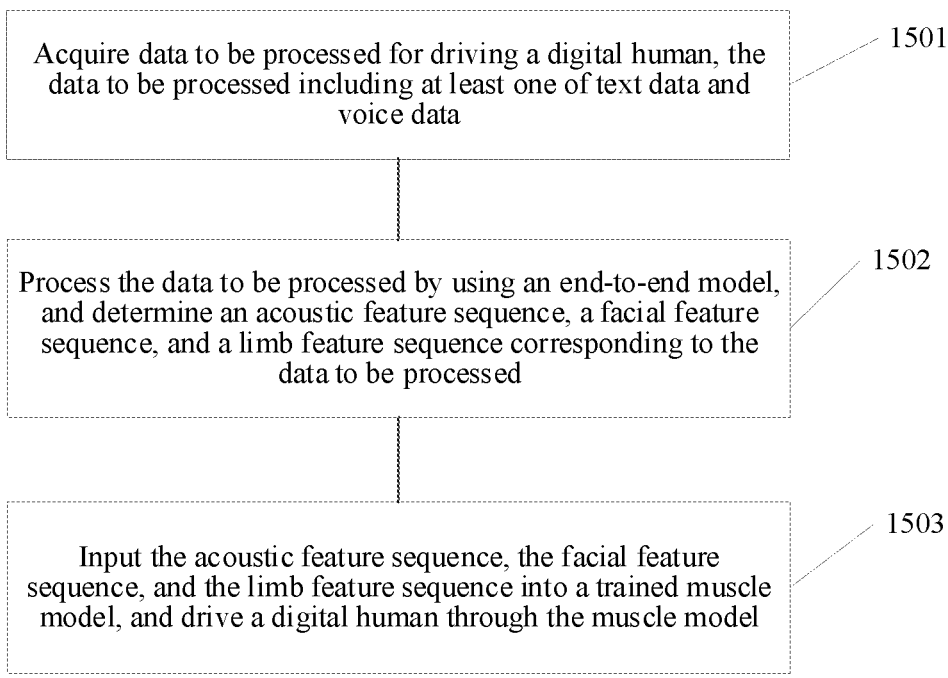
FIG. 15 is a flowchart of a method for driving a digital human in real time according to one or more embodiments of the present disclosure.

Refer to FIG. 15, which is a flowchart of steps of a method for driving a digital human in real time according to an embodiment of the present disclosure, which may specifically include the following steps:

1501: acquiring data to be processed for driving a digital human, the data to be processed including at least one of text data and voice data;

1502: processing the data to be processed by using an end-to-end model, and determining an acoustic feature sequence, a facial feature sequence, and a limb feature sequence corresponding to the data to be processed; and

1503: inputting the acoustic feature sequence, the facial feature sequence, and the limb feature sequence into a trained muscle model, and driving a digital human through the muscle model.

Step 1501 includes:

step 15021: acquiring a text feature and a duration feature of the data to be processed;

step 15022: determining the acoustic feature sequence according to the text feature and the duration feature; and step 15023: determining the facial feature sequence and the limb feature sequence according to the text feature and the duration feature.

In step 1501, for a client, the client may receive the data to be processed uploaded by a user; for a server, the server may receive the data to be processed sent by a client. It can be understood that any first device may receive a text to be processed from a second device, and the specific transmission manner of the data to be processed is not limited in the embodiments of the present disclosure.

If the data to be processed is text data, the data to be processed is processed by directly performing step 1502. If the data to be processed is voice data, the data to be processed is converted into text data, and then the text data is processed by performing step 1502.

In step 1502, the end-to-end model needs to be obtained through training first. The end-to-end model includes two training methods, where one of which is for training the end-to-end model to output an acoustic feature sequence, and the other is for training the end-to-end model to output a facial feature sequence and a limb feature sequence. The end-to-end model may specifically be a fastspeech model.

The trained end-to-end model for outputting an acoustic feature sequence is used as a first end-to-end model. For details of the training process of the first end-to-end model, reference may be made to the description of the above steps A1-A4. The trained end-to-end model for outputting a facial feature sequence and a limb feature sequence is used as a second end-to-end model. For details of the training process of the second end-to-end model, reference may be made to the description of the above steps B1-B4.

In step 15021, the text feature may be acquired through a fastspeech model, and the duration feature may be acquired through a duration model, the duration model being a deep learning model.

If the end-to-end model is a fastspeech model, after a first fastspeech model and a second fastspeech model are obtained through training, the text feature of the data to be processed is acquired by using any one of the fastspeech models, and then the duration feature is acquired by using a duration model. The duration model may be a deep learning model such as a CNN and a DNN.

In step 15022, when a fastspeech model trained to output an acoustic feature sequence is the first fastspeech model, and a fastspeech model trained to output a facial feature sequence and a limb feature sequence is the second fastspeech model, the text feature and the duration feature may be inputted into the first fastspeech model to obtain the acoustic feature sequence. In step 15023, the text feature and the duration feature are inputted into the second fastspeech model to obtain the facial feature sequence and the limb feature sequence.

If the end-to-end model is a fastspeech model, after a first fastspeech model and a second fastspeech model are obtained through training, the text feature of the data to be processed is acquired by using any one of the fastspeech models, and then the duration feature is acquired by using a duration model. The duration model may be a deep learning model such as a CNN and a DNN.

Figure 16:
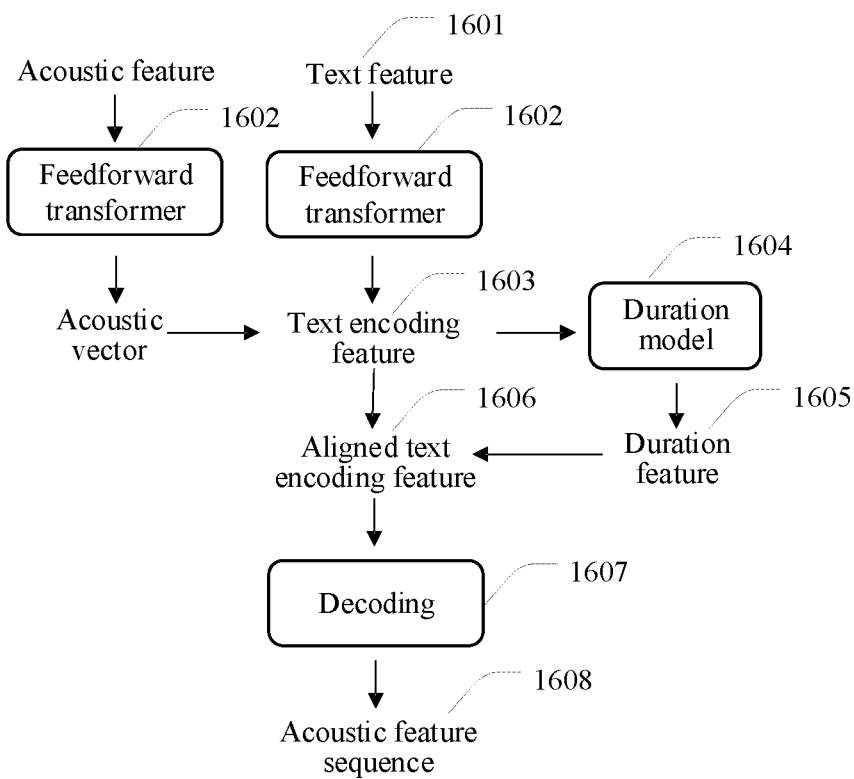
FIG. 16 is a flowchart of steps for outputting an acoustic feature sequence from a first fastspeech model according to one or more embodiments of the present disclosure.

In an embodiment of the present disclosure, as shown in FIG. 16, for example, the acquisition of the acoustic feature sequence by the first fastspeech model includes the following steps: acquiring a text feature 1601 of the data to be processed through an embedding layer of the first fastspeech model, encoding the text feature 1601 using a feedforward transformer 1602 to obtain a text encoding feature 1603; processing the text encoding feature 1603 through a duration model 1604 to obtain a duration feature 1605, where the duration feature 1604 may be used to represent a duration of each phoneme in the text encoding feature 30; then, aligning the text encoding feature 1603 according to the duration feature 1605 to obtain an aligned text encoding feature 1606; and decoding 1607 the aligned text encoding feature 1606 and making a prediction to obtain an acoustic feature sequence 1607.

In an embodiment of the present disclosure, the text encoding feature 1603 is at the phoneme level, and the aligned text encoding feature 1606 may be at a frame level or the phoneme level, which is not particularly limited in the embodiments of the present disclosure.

In an embodiment of the present disclosure, in the process of obtaining the facial feature sequence and the limb feature sequence by using the second fastspeech model, a text feature of the data to be processed may be obtained through an embedding layer of the second fastspeech model; then the text feature is encoded through a feedforward transformer to obtain a text encoding feature; the text encoding feature is processed through the duration model to obtain the duration feature, and the text encoding feature is aligned according to the duration feature to obtain an aligned text encoding feature; and the aligned text encoding feature is decoded, and a face prediction and a limb prediction are made to obtain a facial feature sequence and a limb feature sequence.

Next, step 1503 is performed to fuse the acoustic feature sequence, the facial feature sequence, and the limb feature sequence to obtain a fused feature sequence. In an embodiment of the present disclosure, the acoustic feature sequence, the facial feature sequence, and the limb feature sequence may be fused based on the duration feature to obtain the fused feature sequence. After the fused feature sequence is acquired, the fused feature sequence is inputted into a trained muscle model, and a digital human is driven through the muscle model.

In an embodiment of the present disclosure, the acoustic feature sequence, the facial feature sequence, and the limb feature sequence are aligned according to the duration feature to obtain the fused feature sequence, then the fused feature sequence is inputted into the trained muscle model, and the digital human is driven through the muscle model.

For details of the training process of the muscle model, reference may be made to the description of steps C1-C3. In this case, after the fused feature sequence is obtained, a corresponding bound muscle in the muscle model is directly driven by the fused feature sequence. When the bound muscle is driven by the fused feature sequence to perform a corresponding movement, the facial expression and action are correspondingly changed according to the movement of the bound muscle.

For example, when the acoustic feature sequence is saying "goodbye", the facial expression is a smile, and the limb action is waving a hand. In this case, according to the duration feature, a time period corresponding to saying "goodbye" may be aligned with the facial feature sequence being a facial feature sequence of a smile and the limb feature sequence being a limb feature sequence of waving a hand, to obtain an aligned feature sequence, i.e., the fused feature sequence. In this case, the fused feature sequence is inputted into the muscle model, and the digital human is controlled through the muscle model to smile and wave a hand when saying "goodbye", so that voice of the digital human matches with the face and action.

In another example, when the acoustic feature sequence is saying "come here", the facial expression is a smile, and the limb action is beckoning. In this case, according to the duration feature, a time period corresponding to saying "come here" may be aligned with the facial feature sequence being a facial feature sequence of a smile and the limb action sequence being a limb action sequence of beckoning, to obtain an aligned feature sequence, i.e., the fused feature sequence. In this case, the fused feature sequence is inputted into the muscle model, and the digital human is controlled through the muscle model to smile and beckon when saying "come here", so that voice of the digital human matches with the face and action.

In an embodiment of the present disclosure, after data to be processed is acquired, the data to be processed is processed by using an end-to-end model to obtain an acoustic feature sequence, a facial feature sequence, and a limb feature sequence; then the acoustic feature sequence, the facial feature sequence, and the limb feature sequence are inputted into a trained muscle model, and a digital human is driven through the muscle model. Because the input of the end-to-end model is raw data of the data to be processed, directly outputting the acoustic feature sequence, the facial feature sequence, and the limb feature sequence can better utilize and adapt to the parallel computing power of new hardware (such as GPUs) to achieve faster computing, that is, the acoustic feature sequence, the facial feature sequence, and the limb feature sequence can be acquired in a shorter time. Then the acoustic feature sequence, the facial feature sequence, and the limb feature sequence are inputted into the muscle model to directly drive the digital human. To be specific, after the digital human is created, the voice output of the digital human is controlled directly through the acoustic feature sequence, and at the same time, the facial expression and limb movement of the digital human are controlled through the facial feature sequence and the limb feature sequence. Compared with existing technologies requiring remodeling of the digital human, the present disclosure reduces the amount of calculation and the amount of data transmitted, and also improves the computing efficiency, thereby greatly improving the real-time performance of driving the digital human, so that the digital human can be driven in real time.

Moreover, because the end-to-end model uses the duration feature to obtain the acoustic feature sequence, the facial feature sequence, and the limb feature sequence, and the duration feature can enhance the synchronization of the acoustic feature sequence with the facial feature sequence and the limb feature sequence, using the acoustic feature sequence, the facial feature sequence, and the limb feature sequence to drive the digital human on the basis of enhancing the synchronization can achieve a higher precision in matching a voice output of the digital human with a facial expression and a limb feature.

Method Embodiment 2

Figure 17:
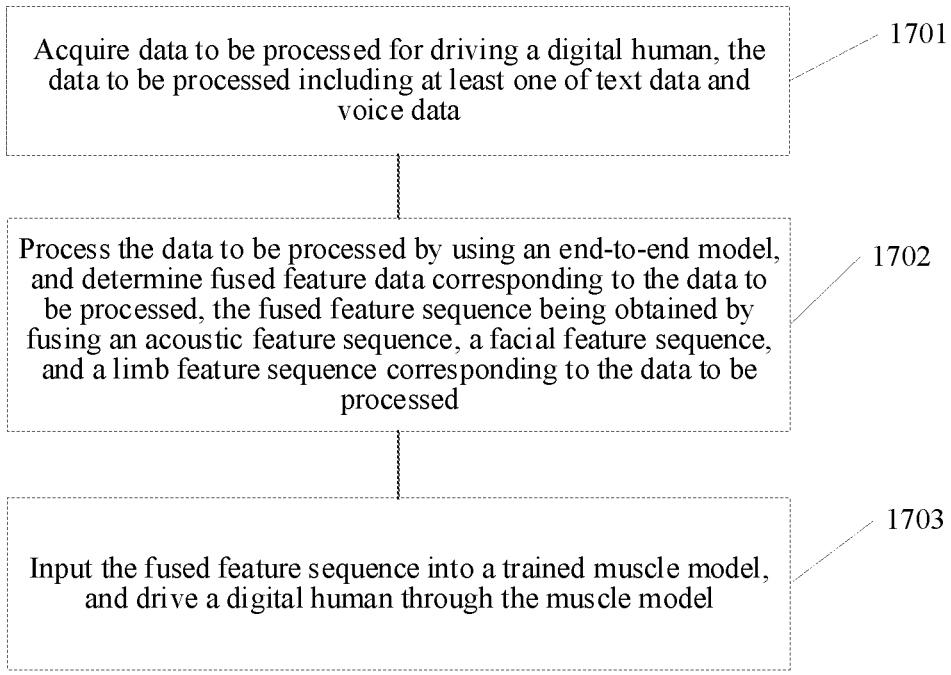
FIG. 17 is another flowchart of a method for driving a digital human in real time according to one or more embodiments of the present disclosure.

Refer to FIG. 17, which is a flowchart of steps of a method for driving a digital human in real time according to an embodiment of the present disclosure, which may specifically include the following steps:

1701: acquiring data to be processed for driving a digital human, the data to be processed including at least one of text data and voice data;

1702: processing the data to be processed by using an end-to-end model, and determining fused feature data corresponding to the data to be processed, the fused feature sequence being obtained by fusing an acoustic feature sequence, a facial feature sequence, and a limb feature sequence corresponding to the data to be processed; and 1703: inputting the fused feature sequence into a trained muscle model, and driving a digital human through the muscle model.

Step 1702 includes:

step 17021: acquiring a text feature and a duration feature of the data to be processed;

step 17022: determining the acoustic feature sequence, the facial feature sequence, and the limb feature sequence according to the text feature and the duration feature; and step 17023: obtaining the fused feature sequence according to the acoustic feature sequence, the facial feature sequence, and the limb feature sequence.

In step 1701, for a client, the client may receive the data to be processed uploaded by a user; for a server, the server may receive the data to be processed sent by a client. It can be understood that any first device may receive a text to be processed from a second device, and the specific transmission manner of the data to be processed is not limited in the embodiments of the present disclosure.

If the data to be processed is text data, the data to be processed is processed by directly performing step 1702. If the data to be processed is voice data, the data to be processed is converted into text data, and then the text data is processed by performing step 1702.

In step 1702, the end-to-end model needs to be obtained through training first, so that the end-to-end model obtained after the training outputs a fused feature sequence. In this case, the end-to-end model for outputting a fused feature sequence may be used as a third end-to-end model.

In an embodiment of the present disclosure, training samples for training the third end-to-end model may be real-person video data and real-person action data. For each training sample in a training sample set, specific training steps are as follows. Step D1 is first performed to obtain a facial feature, a limb feature, and a text feature of the training sample. The text feature may be at the phoneme level.

In an embodiment of the present disclosure, feature data of the training sample may be mapped to an embedding layer in the end-to-end model to obtain the facial feature, the limb feature, and the text feature. Then step D2 is performed to process the facial feature, the limb feature, and the text feature by using a feedforward transformer to obtain a facial feature vector, a limb feature vector, and a text encoding feature. The facial feature vector is used for representing a feature of a facial expression. The limb feature vector may be a muscle action vector. The text encoding feature is also at the phoneme level. Next, step D3 is performed to align the facial feature vector and the limb feature vector with the text encoding feature. A duration predictor may be used to align the facial feature vector and the limb feature vector with the text encoding feature. The text encoding feature is specifically a phoneme feature. Next, step D4 is performed to acquire an acoustic feature sequence, a facial feature sequence, and a limb feature sequence. Next, step D5 is performed to fuse the acoustic feature sequence, the facial feature sequence, and the limb feature sequence to obtain a fused feature sequence. In this case, a length adjuster may be used to align voice, facial expressions, and actions by extending or shortening the phoneme duration, so as to obtain the fused feature sequence.

In an embodiment of the present disclosure, the text feature may include a phoneme feature and/or a semantic feature, and the like. In some embodiments, a phoneme is the smallest phonetic unit of speech divided according to natural properties. As analyzed according to pronunciation actions in syllables, one action constitutes one phoneme. Phonemes may include vowels and consonants. In some embodiments, a specific phoneme feature corresponds to a specific lip feature, facial expression feature, or limb feature, etc.

Semantics refers the meanings of concepts represented by objects in the real world that correspond to a text to be processed, and the relationship between these meanings, and is an interpretation and logical representation of the text to be processed in a certain field. In some embodiments, a specific semantic feature corresponds to a specific limb feature, etc.

A training sample set for training the third end-to-end model includes real-person action data or real-person video data. For the training process of the end-to-end model for outputting a facial feature sequence and a limb feature sequence, reference may be made to the training process of the end-to-end model for outputting an acoustic feature sequence, and the details will not be repeated herein for the sake of brevity.

Accordingly, after data to be processed is obtained, a text feature of the data to be processed may be acquired by using an embedding layer of the third end-to-end model, then a duration feature of the data to be processed may be acquired, and the text feature and the duration feature are inputted into the third end-to-end model to obtain the acoustic feature sequence, the facial feature sequence, and the limb feature sequence. The acoustic feature sequence, the facial feature sequence, and the limb feature sequence are fused based on the duration feature to obtain the fused feature sequence.

In step 17021, when the end-to-end model is a fastspeech model, the text feature may be acquired through a third fastspeech model, and the duration feature may be acquired through a duration model, the duration model being a deep learning model.

In step 17022, when the fastspeech model trained to output an acoustic feature sequence is the third fastspeech model, the text feature and the duration feature may be inputted into the first fastspeech model to determine the acoustic feature sequence, the facial feature sequence, and the limb feature sequence. In step 17023, the fused feature sequence is obtained according to the acoustic feature sequence, the facial feature sequence, and the limb feature sequence.

In an embodiment of the present disclosure, the acoustic feature sequence, the facial feature sequence, and the limb feature sequence may be aligned based on the duration feature to obtain the fused feature sequence.

If the end-to-end model is a fastspeech model, after the third fastspeech model is obtained through training, the text feature of the data to be processed is acquired by using the third fastspeech model, and then the duration feature is acquired by using a duration model. The duration model may be a deep learning model such as a CNN and a DNN.

In an embodiment of the present disclosure, in the process of obtaining the fused feature sequence by using the third fastspeech model, a text feature of the data to be processed may be obtained through an embedding layer of the third fastspeech model; then the text feature is encoded through a feedforward transformer to obtain a text encoding feature; the text encoding feature is processed through the duration model to obtain the duration feature, and the text encoding feature is aligned according to the duration feature to obtain an aligned text encoding feature; and the aligned text encoding feature is decoded, and a voice prediction, a face prediction, and a limb prediction are made to obtain an acoustic feature sequence, a facial feature sequence, and a limb feature sequence. Then the acoustic feature sequence, the facial feature sequence, and the limb feature sequence are fused based on the duration feature to obtain an aligned acoustic feature sequence, facial feature sequence, and limb feature sequence, where the aligned acoustic feature sequence, facial feature sequence, and limb feature sequence are used as a fused feature sequence.

Next, step 1703 is performed to input the fused feature sequence into a trained muscle model after the fused feature sequence is acquired, and drive a digital human through the muscle model.

In an embodiment of the present disclosure, the fused feature sequence is inputted into the trained muscle model, and the digital human is driven through the muscle model.

In an embodiment of the present disclosure, for details of the training process of the muscle model, reference may be made to the description of steps C1-C3. In this case, after the fused feature sequence is obtained, a corresponding bound muscle in the muscle model is directly driven by the fused feature sequence. When the bound muscle is driven by the fused feature sequence to perform a corresponding movement, the facial expression and action are correspondingly changed according to the movement of the bound muscle.

For example, when the acoustic feature sequence is saying "goodbye", the facial expression is a smile, and the limb action is waving a hand. In this case, because the fused feature sequence is aligned based on the duration feature, the digital human smiles and waves a hand when saying "goodbye", so that voice of the digital human matches with the face and action.

In another example, when the acoustic feature sequence is saying "someone is injured", the facial expression is sadness and the limb action is folding hands. In this case, because the fused feature sequence is aligned based on the duration feature, the digital human shows sadness on the face and folds hands when saying "someone is injured", so that voice of the digital human matches with the face and action.

In an embodiment of the present disclosure, after data to be processed is acquired, the data to be processed is processed by using an end-to-end model to obtain a fused feature sequence which is obtained by fusing an acoustic feature sequence, a facial feature sequence, and a limb feature sequence; then the fused feature sequence is inputted into a trained muscle model, and a digital human is driven through the muscle model. Because the input of the end-to-end model is raw data of the data to be processed, directly outputting the fused feature sequence which is obtained by fusing the acoustic feature sequence, the facial feature sequence, and the limb feature sequence can better utilize and adapt to the parallel computing power of new hardware (such as GPUs) to achieve faster computing, that is, the fused feature sequence can be acquired in a shorter time. Then the fused feature sequence is inputted into the muscle model to directly drive the digital human. To be specific, after the digital human is created, the voice output, facial expression, and limb movement of the digital human are controlled directly through the fused feature sequence. Compared with existing technologies requiring remodeling of the digital human, the present disclosure reduces the amount of calculation and the amount of data transmitted, and also improves the computing efficiency, thereby greatly improving the real-time performance of driving the digital human, so that the digital human can be driven in real time.

Moreover, because the end-to-end model uses the duration feature to fuse the acoustic feature sequence, the facial feature sequence, and the limb feature sequence in order to obtain the fused feature sequence, and the duration feature can enhance the synchronization of the acoustic feature sequence with the facial feature sequence and the limb feature sequence, using the fused feature sequence to drive the digital human on the basis of enhancing the synchronization can achieve a higher precision in matching a voice output of the digital human with a facial expression and a limb feature.

Apparatus Embodiment 1

Figure 18:
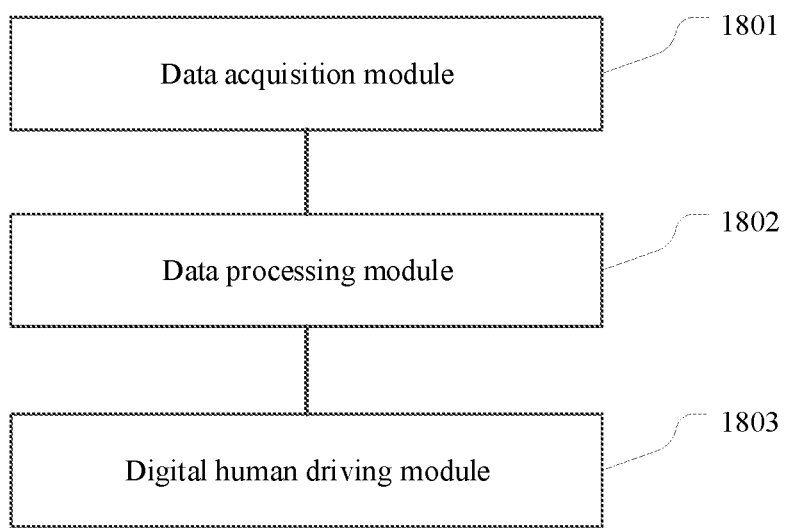
FIG. 18 is a schematic structural diagram of an apparatus for driving a digital human in real time according to one or more embodiments of the present disclosure.

Refer to FIG. 18, which is a structural block diagram of an apparatus for driving a digital human in real time according to an embodiment of the present disclosure, which may specifically include:
- a data acquisition module 1801, configured to acquire data to be processed for driving a digital human, the data to be processed including at least one of text data and voice data;
- a data processing module 1802, configured to process the data to be processed by using an end-to-end model, and determine an acoustic feature sequence, a facial feature sequence, and a limb feature sequence corresponding to the data to be processed; and
- a digital human driving module 1803, configured to input the acoustic feature sequence, the facial feature sequence, and the limb feature sequence into a trained muscle model, and drive a digital human through the muscle model.

The data processing module 1802 is further configured to: acquire a text feature and a duration feature of the data to be processed; determine the acoustic feature sequence according to the text feature and the duration feature; and determine the facial feature sequence and the limb feature sequence according to the text feature and the duration feature.

In some embodiments, the data processing module 1802 is configured to acquire the text feature through a fastspeech model; and acquire the duration feature through a duration model, the duration model being a deep learning model.

In some embodiments, the data processing module 1802 is configured to, when a fastspeech model trained to output an acoustic feature sequence is the first fastspeech model, and a fastspeech model trained to output a facial feature sequence and a limb feature sequence is the second fastspeech model, input the text feature and the duration feature into the first fastspeech model to obtain the acoustic feature sequence; and input the text feature and the duration feature into the second fastspeech model to obtain the facial feature sequence and the limb feature sequence.

In some embodiments, the digital human driving module 1803 is configured to fuse the acoustic feature sequence, the facial feature sequence, and the limb feature sequence to obtain a fused feature sequence; and
   input the fused feature sequence into the muscle model.

In some embodiments, the digital human driving module 1803 is configured to fuse the acoustic feature sequence, the facial feature sequence, and the limb feature sequence based on the duration feature to obtain the fused feature sequence.

In some embodiments, facial features corresponding to the facial feature sequence include an expression feature and a lip feature.

The apparatus embodiments are substantially similar to the method embodiments and therefore are only briefly described, and reference may be made to the description of the parts of the method embodiments for the associated parts.

The embodiments in the present disclosure are described in a progressive manner. Each embodiment focuses on a difference from other embodiments. Refer to these embodiments for same or similar parts in the embodiments.

For the apparatus in the foregoing embodiments, a specific manner in which each module performs an operation is already described in detail in the embodiments related to the method, and details are not described herein again.

Apparatus Embodiment 2

Figure 19:
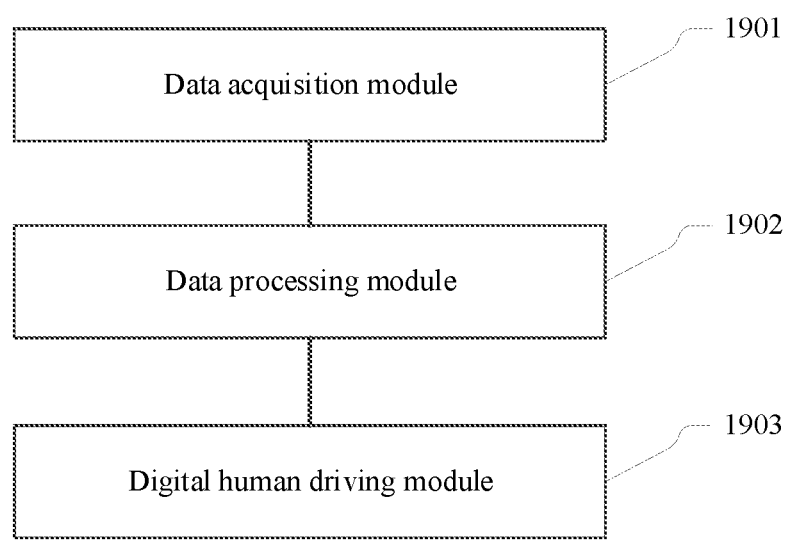
FIG. 19 is another schematic structural diagram of an apparatus for driving a digital human in real time according to one or more embodiments of the present disclosure.

Refer to FIG. 19, which is a structural block diagram of an apparatus for driving a digital human in real time according to an embodiment of the present disclosure, which may specifically include:
- a data acquisition module 1901, configured to acquire data to be processed for driving a digital human, the data to be processed including at least one of text data and voice data;
- a data processing module 1902, configured to process the data to be processed by using an end-to-end model, and determine fused feature data corresponding to the data to be processed, the fused feature sequence being obtained by fusing an acoustic feature sequence, a facial feature sequence, and a limb feature sequence corresponding to the data to be processed; and
- a digital human driving module 1903, configured to input the fused feature sequence into a trained muscle model, and drive a digital human through the muscle model.

The data processing module 1902 is further configured to: acquire a text feature and a duration feature of the data to be processed; determine the acoustic feature sequence, the facial feature sequence, and the limb feature sequence according to the text feature and the duration feature; and obtain the fused feature sequence according to the acoustic feature sequence, the facial feature sequence, and the limb feature sequence.

In some embodiments, a data processing module 1902, configured to acquire the text feature through a fastspeech model; and acquire the duration feature through a duration model, the duration model being a deep learning model.

In some embodiments, the data processing module 1902 is configured to align the acoustic feature sequence, the facial feature sequence, and the limb feature sequence based on the duration feature to obtain the fused feature sequence.

In some embodiments, facial features corresponding to the facial feature sequence include an expression feature and a lip feature.

The apparatus embodiments are substantially similar to the method embodiments and therefore are only briefly described, and reference may be made to the description of the parts of the method embodiments for the associated parts.

The embodiments in the present disclosure are described in a progressive manner. Each embodiment focuses on a difference from other embodiments. Refer to these embodiments for same or similar parts in the embodiments.

For the apparatus in the present disclosure, a specific manner in which each module performs an operation is already described in detail in the embodiments related to the method, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Referring back to FIG. 12, FIG. 12 is also a structural block diagram of an apparatus for driving a digital human in real time as a device according to an embodiment of the present disclosure. For example, the apparatus 900 may be a mobile phone, a computer, a digital broadcasting terminal, a messaging device, a game console, a tablet device, a medical device, a fitness facility, a personal digital assistant, or the like.

Referring to FIG. 12, the apparatus 900 may include one or more of the following components: a processing component 902, a memory 904, a power supply component 906, a multimedia component 908, an audio component 910, an input/output (I/O) interface 912, a sensor component 914, and a communication component 916.

The processing component 902 usually controls the whole operation of the apparatus 900, such as operations associated with displaying, an incoming call, data communication, a camera operation, and a recording operation. The processing component 902 may include one or more processors 920 to execute instructions, to complete all or some steps of the foregoing method. In addition, the processing component 902 may include one or more modules, to facilitate the interaction between the processing component 902 and other components. For example, the processing component 902 may include a multimedia module, to facilitate the interaction between the multimedia component 908 and the processing component 902.

The memory 904 is configured to store data of various types to support operations on the device 900. Examples of the data include instructions, contact data, call book data, messages, pictures, videos, and the like of any application program or method used to be operated on the apparatus 900. The memory 904 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 906 provides power to various components of the apparatus 900. The power supply component 906 may include a power supply management system, one or more power supplies, and other components associated with generating, managing and allocating power for the apparatus 900.

The multimedia component 908 includes a screen providing an output interface between the apparatus 900 and a user. In some embodiments, the screen may include a liquid crystal display (LCD) and a touch panel (TP). If the screen includes a TP, the screen may be implemented as a touchscreen to receive an input signal from the user. The touch panel includes one or more touch sensors to sense a touch, a slide, and a gesture on the touch panel. The touch sensor may not only sense a boundary of the touch or slide movement, but also detect duration and pressure related to the touch or slide operation. In some embodiments, the multimedia component 908 includes a front camera and/or a rear camera. When the device 900 is in an operating mode, such as a shooting mode or a video mode, the front-facing camera and/or the rear-facing camera may receive external multimedia data. Each front camera and rear camera may be a fixed optical lens system or have a focal length and an optical zooming capability.

The audio component 910 is configured to output and/or input an audio signal. For example, the audio component 910 includes a microphone (MIC), and when the apparatus 900 is in an operation mode, such as a call mode, a recording mode, and a voice identification mode, the MIC is configured to receive an external audio signal. The received audio signal may further be stored in the memory 904 or sent through the communication component 916. In some embodiments, the audio component 910 further includes a speaker, configured to output an audio signal.

The I/O interface 912 provides an interface between the processing component 902 and an external interface module. The external interface module may be a keyboard, a click wheel, buttons, or the like. The buttons may include, but not limited to a homepage button, a volume button, a start-up button, and a locking button.

The sensor component 914 includes one or more sensors, configured to provide status evaluation in each aspect to the apparatus 900. For example, the sensor component 914 may detect an opened/closed status of the apparatus 900, and relative positioning of the component. For example, the component is a display and a small keyboard of the apparatus 900. The sensor component 914 may further detect the position change of the apparatus 900 or one component of the apparatus 900, the existence or nonexistence of contact between the user and the apparatus 900, the azimuth or acceleration/deceleration of the apparatus 900, and the temperature change of the apparatus 900. The sensor component 914 may include a proximity sensor, configured to detect the existence of nearby objects without any physical contact. The sensor component 914 may further include an optical sensor, such as a CMOS or CCD image sensor, which is used in an imaging application. In some embodiments, the sensor component 914 may further include an acceleration sensor, a gyroscope sensor, a magnetic sensor, a pressure sensor, or a temperature sensor.

The communication component 916 is configured to facilitate communication in a wired or wireless manner between the apparatus 900 and other devices. The apparatus 900 may access a wireless network based on communication standards, such as Wi-Fi, 2G, or 3G, or a combination thereof. In some embodiments, the communication component 916 receives a broadcast signal or broadcast related information from an external broadcast management system via a broadcast channel. In some embodiments, the communication component 916 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In some embodiments, the apparatus 900 can be implemented as one or more application specific integrated circuit (ASIC), a digital signal processor (DSP), a digital signal processing device (DSPD), a programmable logic device (PLD), a field programmable gate array (FPGA), a controller, a micro-controller, a microprocessor or other electronic element, so as to perform the foregoing method.

In some embodiments, a non-transitory computer readable storage medium including instructions, for example, a memory 904 including instructions, is further provided, and the foregoing instructions may be executed by a processor 920 of the apparatus 900 to complete the foregoing method. For example, the non-temporary computer-readable storage medium may be a ROM, a random access memory (RAM), a CD-ROM, a magnetic tape, a floppy disk, an optical data storage device, or the like.

Referring back to FIG. 13, FIG. 13 is also a structural block diagram of a server according to an embodiment of the present disclosure. The server 1900 may vary due to different configurations or performance, and may include one or more central processing units (CPU) 1922 (for example, one or more processors) and memories 1932, and one or more storage media 1930 (for example, one or more mass storage devices) storing an application program 1942 or data 1944. The memory 1932 and the storage medium 1930 may be transient storage or persistent storage. The program stored in the storage medium 1930 may include one or more modules (not marked in the figure), and each module may include a series of instruction operations to the server. Still further, the central processing unit 1922 may be configured to communicate with the storage medium 1930 to perform the series of instruction operations in the storage medium 1930 on the server 1900.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

Provided is a non-transitory computer-readable storage medium, storing instructions that, when executed by a processor of an apparatus (device or server), cause the apparatus to perform a method for driving a digital human in real time, the method including: determining a duration feature corresponding to a text to be processed, the text to be processed involves at least two languages; determining a target speech sequence corresponding to the text to be processed according to the duration feature; determining a target image sequence corresponding to the text to be processed according to the duration feature, the target image sequence being obtained according to a text sample and an image sample corresponding to the text sample, languages corresponding to the text sample including all the languages involved in the text to be processed; and fusing the target speech sequence and the target image sequence to obtain a corresponding target video.

This specification is described with reference to the flowcharts and/or block diagrams of the method, the device (system), and the computer program product according to the present disclosure. It is to be understood that computer program instructions can implement each process and/or block in the flowcharts and/or block diagrams and a combination of processes and/or blocks in the flowcharts and/or block diagrams. The computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

The computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

The computer program instructions may also be loaded onto a computer or another programmable data processing device, so that a series of operations and steps are performed on the computer or another programmable device, thereby generating computer-implemented processing. Therefore, the instructions executed on the computer, or another programmable device provide steps for implementing a specific function in one or more processes in the flowcharts and/or in one or more blocks in the block diagrams.

A person skilled in the art upon consideration of the specification and practice of the present disclosure disclosed herein will readily appreciate other implementations of the present disclosure. This application is intended to cover any variations, uses, or adaptations of the present disclosure, and the variations, uses, and adaptations follow a general principle of the present disclosure and include common sense or common technical means in this technical field that are not disclosed in the present disclosure. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

The above are only preferred embodiments of the present disclosure and are not intended to limit the present disclosure. Any modification, equivalent replacement, or improvement made within the spirit and principle of the present disclosure shall be included in the protection scope of the present disclosure.

What is claimed is:

1. A method for driving a digital human, comprising:
obtaining a target action corresponding to a target text;
obtaining a reference action to be executed before the digital human executes the target action when the digital human is driven to output speech based on the target text;
modifying a target action parameter of the target action according to a reference action parameter of the reference action, comprising:
obtaining a plurality of target actions and an action parameter of each target action from a preset action library, the plurality of target actions being different forms of a same action type corresponding to the target text, and the action parameter of each target action comprising a start action parameter and an end action parameter according to different timing in a complete action of the target action;

respectively determining a difference between the start action parameter of each of the plurality of target actions and an end action parameter of the reference action;

obtaining an action parameter corresponding to a start action parameter having a smallest difference with the end action parameter in the reference action parameter as the target action parameter according to the action parameter of each target action; and modifying the target action parameter according to the reference action parameter, so that a difference between basic action parameters corresponding to the modified target action parameter and the reference action parameter is decreased; and driving the digital human to execute the target action according to the modified target action parameter when driving the digital human to output the speech based on the target text.

2. The method according to claim 1, wherein before the obtaining the target action corresponding to the target text, the method further comprises:

obtaining a target action corresponding to a text that needs to be processed; and converting the text that needs to be processed into the target text by using a speech synthesis markup language, and inserting a label of the target action into the target text.

3. The method according to claim 2, wherein the obtaining the target action corresponding to the text that needs to be processed comprises:

obtaining a preset keyword in the text that needs to be processed; and obtaining a predetermined action corresponding to the preset keyword as the target action.

4. The method according to claim 2, wherein the obtaining the target action corresponding to the text that needs to be processed comprises:

performing semantic recognition on the text that needs to be processed, to obtain an action intention comprised in the text that needs to be processed; and obtaining a predetermined action corresponding to the action intention as the target action.

5. The method according to claim 1, wherein the action parameter is a bone position parameter or a muscle movement parameter.

6. The method according to claim 1, wherein the target action is a facial expression or a body action.

7. An electronic device, comprising a memory and one or more programs, the one or more programs being stored in the memory, and being configured so that one or more processors execute corresponding operation instructions comprised in the one or more programs and used for performing the method for driving a digital human comprising:

obtaining a target action corresponding to a target text;
obtaining a reference action to be executed before the digital human executes the target action when the digital human is driven to output speech based on the target text;

modifying a target action parameter of the target action according to a reference action parameter of the reference action, comprising:

obtaining a plurality of target actions and an action parameter of each target action from a preset action library, the plurality of target actions being different forms of a same action type corresponding to the target text, and the action parameter of each target action comprising a start action parameter and an end action parameter according to different timing in a complete action of the target action;

respectively determining a difference between the start action parameter of each of the plurality of target actions and an end action parameter of the reference action;

obtaining an action parameter corresponding to a start action parameter having a smallest difference with the end action parameter in the reference action parameter as the target action parameter according to the action parameter of each target action; and modifying the target action parameter according to the reference action parameter, so that a difference between basic action parameters corresponding to the modified target action parameter and the reference action parameter is decreased; and driving the digital human to execute the target action according to the modified target action parameter when driving the digital human to output the speech based on the target text.

8. The electronic device according to claim 7, wherein before the obtaining the target action corresponding to the target text, the method further comprises:

obtaining a target action corresponding to a text that needs to be processed; and converting the text that needs to be processed into the target text by using a speech synthesis markup language, and inserting a label of the target action into the target text.

9. The electronic device according to claim 8, wherein the obtaining the target action corresponding to the text that needs to be processed comprises:

obtaining a preset keyword in the text that needs to be processed; and obtaining a predetermined action corresponding to the preset keyword as the target action.

10. The electronic device according to claim 8, wherein the obtaining the target action corresponding to the text that needs to be processed comprises:

performing semantic recognition on the text that needs to be processed, to obtain an action intention comprised in the text that needs to be processed; and obtaining a predetermined action corresponding to the action intention as the target action.

11. The electronic device according to claim 7, wherein the action parameter is a bone position parameter or a muscle movement parameter.

12. The electronic device according to claim 7, wherein the target action is a facial expression or a body action.

13. A non-transitory computer readable storage medium, storing a computer program, when the computer program is executed by a processor, implementing a method for driving a digital human, comprising:

obtaining a target action corresponding to a target text;
obtaining a reference action to be executed before the digital human executes the target action when the digital human is driven to output speech based on the target text;

modifying a target action parameter of the target action according to a reference action parameter of the reference action, comprising:

obtaining a plurality of target actions and an action parameter of each target action from a preset action library, the plurality of target actions being different forms of a same action type corresponding to the target text, and the action parameter of each target action comprising a start action parameter and an end action parameter according to different timing in a complete action of the target action;
respectively determining a difference between the start action parameter of each of the plurality of target actions and an end action parameter of the reference action;
obtaining an action parameter corresponding to a start action parameter having a smallest difference with the end action parameter in the reference action parameter as the target action parameter according to the action parameter of each target action; and
modifying the target action parameter according to the reference action parameter, so that a difference between basic action parameters corresponding to the modified target action parameter and the reference action parameter is decreased; and driving the digital human to execute the target action according to the modified target action parameter when driving the digital human to output the speech based on the target text.

14. The storage medium according to claim 13, wherein before the obtaining the target action corresponding to the target text, the method further comprises:
obtaining a target action corresponding to a text that needs to be processed; and
converting the text that needs to be processed into the target text by using a speech synthesis markup language, and inserting a label of the target action into the target text.

15. The storage medium according to claim 14, wherein the obtaining the target action corresponding to the text that needs to be processed comprises:
obtaining a preset keyword in the text that needs to be processed; and
obtaining a predetermined action corresponding to the preset keyword as the target action.

16. The storage medium according to claim 14, wherein the obtaining the target action corresponding to the text that needs to be processed comprises:
performing semantic recognition on the text that needs to be processed, to obtain an action intention comprised in the text that needs to be processed; and
obtaining a predetermined action corresponding to the action intention as the target action.

17. The storage medium according to claim 13, wherein the action parameter is a bone position parameter or a muscle movement parameter.

18. The method according to claim 1, wherein each action of the digital human comprises a basic action of a first body part that changes based on scenarios and a feature action of a second body part that does not change with scenarios, and modifying the target action parameter according to the reference action parameter comprises:
modifying a basic action parameter corresponding to the first body part in the target action based on a basic action parameter corresponding to the first body part in the reference action to decrease the difference between the basic action parameters corresponding to the modified target action parameter and the reference action parameter.

19. The method according to claim 1, wherein driving the digital human to execute the target action according to the modified target action parameter when driving the digital human to output the speech based on the target text comprises:
processing the target text using an end-to-end model to obtain an acoustic feature sequence, a facial feature sequence, and a limb feature sequence;
obtain a fused feature sequence by aligning the acoustic feature sequence, the facial feature sequence, and the limb feature sequence according to a duration feature; and
inputting the fused feature sequence into a trained muscle model to drive the digital human through the muscle model to execute the target action according to the modified target action parameter and output the speech.

* * * * *